US012810739B2

(12) United States Patent
Zhang et al.

(10) Patent No.: US 12,810,739 B2
(45) Date of Patent: Nov. 24, 2026

(54) FIDUCIAL MARKER DETECTION SYSTEMS AND METHODS

(71) Applicant: FLIR Unmanned Aerial Systems ULC, Vancouver (CA)

(72) Inventors: Jun Zhang, Waterloo (CA); Brandon Pinkney, Waterloo (CA); William Cullen, Waterloo (CA); Edward Butler, North Saanich (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 445 days.

(21) Appl. No.: 18/342,072

(22) Filed: Jun. 27, 2023

(65) Prior Publication Data

US 2023/0356863 A1 Nov. 9, 2023

Related U.S. Application Data

(63) Continuation of application No. PCT/US2021/065765, filed on Dec. 30, 2021.

(Continued)

(51) Int. Cl.

*G08G 5/54* (2025.01)
*B64U 70/95* (2023.01)

(Continued)

(52) U.S. Cl.

CPC ............... *G08G 5/54* (2025.01); *B64U 70/95* (2023.01); *G06T 7/75* (2017.01); *G08G 5/55* (2025.01);

(Continued)

(58) Field of Classification Search

CPC ........................ G08G 5/57; G08G 5/54; G06T 2207/10032; G06T 2207/30204; G06T 7/70;

(Continued)

(56) References Cited

U.S. PATENT DOCUMENTS

2012/0007845 A1 1/2012 Tsuida
2016/0028932 A1 1/2016 Tay et al.
2016/0122038 A1 5/2016 Fleischman et al.

(Continued)

FOREIGN PATENT DOCUMENTS

CA 292861 3/2017
CN 111775152 A * 10/2020 ........... G01B 11/002

(Continued)

OTHER PUBLICATIONS

Zhenglong, Guo, Fu Qiang, and Quan Quan. "Pose estimation for multicopters based on monocular vision and AprilTag." 2018 37th Chinese Control Conference (CCC). IEEE, 2018. (Year: 2018).*

(Continued)

*Primary Examiner* — Sumati Lefkowitz
*Assistant Examiner* — Connor L Hansen
(74) *Attorney, Agent, or Firm* — Haynes and Boone, LLP

(57) ABSTRACT

Fiducial marker detection systems and methods are provided. In one example, a method includes capturing, by a camera of an unmanned aerial vehicle, an image. The method further includes identifying one or more image contours in the image. The method further includes determining a position of a fiducial marker in the image. The method further includes projecting, based at least on the position, models associated with one or more contours of the fiducial marker into an image plane of the camera to obtain one or more model contours. The method further includes determining a pose associated with the fiducial marker based at least on the one or more image contours and the one or more model contours. Related devices and systems are also provided.

20 Claims, 11 Drawing Sheets

Related U.S. Application Data

(60) Provisional application No. 63/133,201, filed on Dec. 31, 2020.

(51) Int. Cl.
*G06T 7/73* (2017.01)
*G08G 5/55* (2025.01)
*G08G 5/57* (2025.01)

(52) U.S. Cl.
CPC ...... *G08G 5/57* (2025.01); *G06T 2207/10032* (2013.01); *G06T 2207/30204* (2013.01)

(58) Field of Classification Search
CPC ........ G06T 7/75; G06V 10/245; G06V 20/17; B64U 70/97; B64U 70/95; B64U 2201/10
See application file for complete search history.

(56) References Cited

U.S. PATENT DOCUMENTS

| | | | | |
|---|---|---|---|---|
| 2016/0257424 | A1* | 9/2016 | Stabler | A63H 27/12 |
| 2019/0197908 | A1* | 6/2019 | Mozer | G01S 19/48 |
| 2020/0225684 | A1 | 7/2020 | Anderson et al. | |
| 2020/0301445 | A1* | 9/2020 | Jourdan | G06K 19/06037 |
| 2022/0084238 | A1* | 3/2022 | Tang | G06T 7/11 |

FOREIGN PATENT DOCUMENTS

| | | | |
|---|---|---|---|
| JP | 2013138449 | A | 7/2013 |
| JP | 2014233075 | | 12/2014 |
| WO | WO 2017096392 | | 6/2017 |
| WO | WO 2019226917 | | 11/2019 |

OTHER PUBLICATIONS

Hui, Xiaolong, et al. "Vision-based autonomous navigation approach for unmanned aerial vehicle transmission-line inspection." International Journal of Advanced Robotic Systems 15.1 (2018) (Year: 2018).*

Jin Shaogang et al., "On-board vision autonomous landing techniques for quadrotor: A survey" 35th Chinese Control Conference, Jul. 27, 2016, pp. 10284-10289.

Mark Fiala, "Designing Highly Reliable Fiducial Markers", IEEE Transactions on Pattern Analysis and Machine Intelligence, IEEE Computer Society, Jul. 1, 2010, pp. 1317-1324, vol. 30, No. 7.

Jamie Wubben et al., "A Vision-Based System for Autonomous Vertical Landing of Unmanned Aerial Vehicles" 2019 IEEE/ACM 23rd International Symposium on Distributed Simulation and Real Time Applications, Oct. 7, 2019, 7 pages.

* cited by examiner

Bi-Model Histogram of Isolated Marker

Full Scene Histogram, Washed Out High Exposure

Full Scene Histogram, Washed Out Low Exposure

Full Scene Histogram, Optimally Centered

LED Illumination Active

FIDUCIAL MARKER DETECTION SYSTEMS AND METHODS

CROSS-REFERENCE TO RELATED APPLICATION

This application is a continuation of International Patent Application No. PCT/US2021/065765 filed Dec. 30, 2021 and entitled "FIDUCIAL MARKER DETECTION SYSTEMS AND METHODS," which claims priority to and the benefit of U.S. Provisional Patent Application No. 63/133,201 filed on Dec. 31, 2020 and entitled "FIDUCIAL MARKER DETECTION SYSTEMS AND METHODS," all of which are hereby incorporated by reference in their entirety.

TECHNICAL FIELD

The present invention relates generally to unmanned aerial vehicles and, more particularly, to fiducial marker detection systems and methods.

BACKGROUND

Modern unmanned sensor platforms, such as unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and others. For example, a UAV may be equipped with a variety of different elements, such as different types of sensors and navigation devices, and may be configured to address a broad variety of operational needs.

SUMMARY

In one or more embodiments, a method includes capturing, by a camera of an unmanned aerial vehicle, an image. The method further includes identifying one or more image contours in the image. The method further includes determining a position of a fiducial marker in the image. The method further includes projecting, based at least on the position, models associated with one or more contours of the fiducial marker into an image plane of the camera to obtain one or more model contours. The method further includes determining a pose associated with the fiducial marker based at least on the one or more image contours and the one or more model contours.

In one or more embodiments, an unmanned aerial vehicle includes a processing circuit configured to descend the unmanned aerial vehicle toward a landing platform, where a plurality of fiducial markers are disposed on the landing platform. The processing circuit is further configured to detect, as the unmanned aerial vehicle descends, at least one fiducial marker among a first subset of the plurality of fiducial markers when the unmanned aerial vehicle is within a first altitude range from the landing platform. The processing circuit is further configured to detect, as the unmanned aerial vehicle descends, at least one fiducial marker among a second subset of the plurality of fiducial markers when the unmanned aerial vehicle is within a second altitude range from the landing platform.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
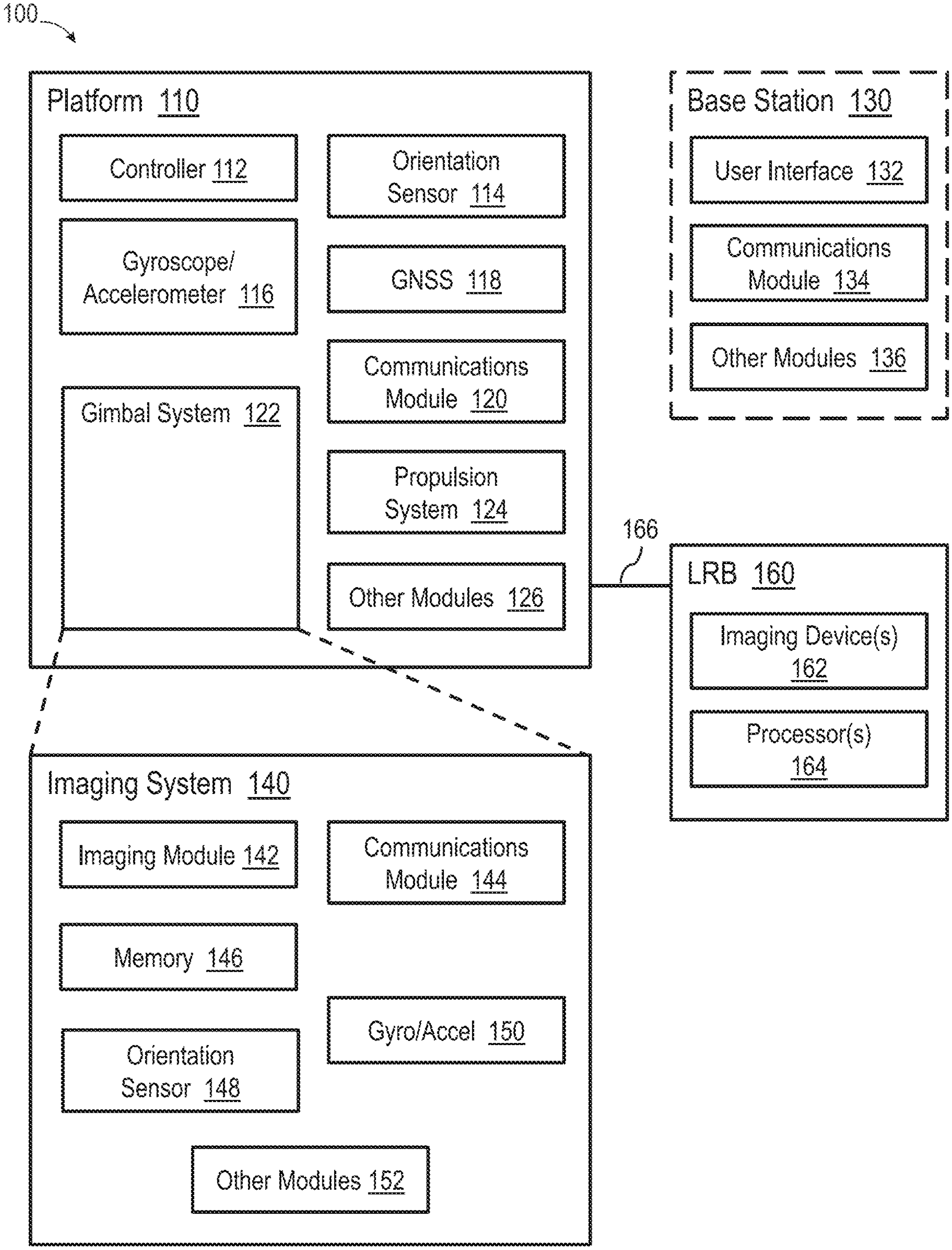
FIG. 1 illustrates a block diagram of a survey system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods are provided for facilitating fiducial marker detection. In some embodiments, a fiducial marker may be tracked by a UAV even when the fiducial marker is partially occluded. In some embodiments, a fiducial marker layout/structure may have redundant/multiple fiducial markers such that at least a subset of these fiducial markers are detectable by the UAV at each point within a usable distance of the fiducial marker layout/structure. In an aspect, the usable distance may span from a minimum detection distance to a maximum detection distance. In some cases, one or more fiducial marker may be disposed on a landing mat. In some embodiments, fiducial marker detection may be facilitated by adjusting camera parameters (e.g., exposure and/or gain) to adjust an intensity centroid and/or by adjusting an intensity of light emitted by a light emitting device (e.g., such as a light emitting diode) of the UAV.

FIG. 1 illustrates a block diagram of a survey system 100 including a mobile platform 110 in accordance with one or more embodiments of the present disclosure. In various embodiments, the survey system 100 and/or elements of the system survey 100 may be configured to fly over a scene or survey area, to fly through a structure, or to approach a target and image or sense the scene, structure, or target, or portions thereof, using a gimbal system 122 to aim an imaging system/sensor payload 140 at the scene, structure, or target, or portions thereof, for example. Resulting imagery and/or other sensor data may be processed (e.g., by the sensor payload 140, mobile platform 110, and/or base station 130) and displayed to a user through use of a user interface 132 (e.g., one or more displays such as a multi-function display (MFD), a portable electronic device such as a tablet, laptop, or smart phone, or other appropriate interface) and/or stored in memory for later viewing and/or analysis. In some embodiments, the survey system 100 may be configured to use such imagery and/or sensor data to control operation of the mobile platform 110 and/or the sensor payload 140, as described herein, such as controlling the gimbal system 122 to aim the sensor payload 140 towards a particular direction, and/or controlling a propulsion system 124 to move the mobile platform 110 to a desired position in a scene or structure or relative to a target. In some cases, the imagery and/or sensor data may be used to detect fiducial markers and, in turn, land the mobile platform 110.

In the embodiment shown in FIG. 1, the survey system 100 includes the mobile platform 110, optional base station 130, and at least one imaging system/sensor payload 140. The mobile platform 110 may be implemented as a mobile platform configured to move or fly and position and/or aim the sensor payload 140 (e.g., relative to a designated or detected target). As shown in FIG. 1, the mobile platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of the mobile platform 110 may be substantially autonomous and/or partially or completely controlled by the optional base station 130, which may include one or more of a user interface 132, a communications module 134, and other modules 136. In other embodiments, the mobile platform 110 may include one or more of the elements of the base station 130, such as with various types of manned aircraft, terrestrial vehicles, and/or surface or subsurface watercraft. The sensor payload 140 may be physically coupled to the mobile platform 110 and be configured to capture sensor data (e.g., visible spectrum images, infrared images, narrow aperture radar data, and/or other sensor data) of a target position, area, and/or object(s) as selected and/or framed by operation of the mobile platform 110 and/or the base station 130. In some embodiments, one or more of the elements of the survey system 100 may be implemented in a combined housing or structure that can be coupled to or within the mobile platform 110 and/or held or carried by a user of the survey system 100.

The controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the mobile platform 110 and/or other elements of the survey system 100, such as the gimbal system 122, for example. Such software instructions may also implement methods for processing infrared images and/or other sensor signals, determining sensor information, providing user feedback (e.g., through the user interface 132), querying devices for operational parameters, selecting operational parameters for devices, or performing any of the various operations described herein (e.g., operations performed by logic devices of various elements of the survey system 100).

In addition, a non-transitory medium may be provided for storing machine readable instructions for loading into and execution by the controller 112. In these and other embodiments, the controller 112 may be implemented with other components where appropriate, such as volatile memory, non-volatile memory, one or more interfaces, and/or various analog and/or digital components for interfacing with devices of the survey system 100. For example, the controller 112 may be adapted to store sensor signals, sensor information, parameters for coordinate frame transformations, calibration parameters, sets of calibration points, and/or other operational parameters, over time, for example, and provide such stored data to a user using the user interface 132. In some embodiments, the controller 112 may be integrated with one or more other elements of the mobile platform 110, for example, or distributed as multiple logic devices within the mobile platform 110, base station 130, and/or sensor payload 140.

In some embodiments, the controller 112 may be configured to substantially continuously monitor and/or store the status of and/or sensor data provided by one or more elements of the mobile platform 110, sensor payload 140, and/or base station 130, such as the position and/or orientation of the mobile platform 110, sensor payload 140, and/or base station 130, for example. In various embodiments, sensor data may be monitored and/or stored by the controller 112 and/or processed or transmitted between elements of the survey system 100 substantially continuously throughout operation of the survey system 100, where such data includes various types of sensor data (e.g., for fiducial marker detection), control parameters, and/or other data.

The orientation sensor 114 may be implemented as one or more of a compass, float, accelerometer, and/or other device capable of measuring an orientation of the mobile platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of the survey system 100. In some cases, a yaw and/or position of the mobile platform 110 may be adjusted to better position/orient the mobile platform 110 to detect fiducial markers, such as to avoid bad lighting and/or occlusions on the fiducial markers. The gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the mobile platform 110 and/or other elements of the survey system 100 and providing such measurements as sensor signals and/or data that may be communicated to other devices of the survey system 100 (e.g., user interface 132, controller 112). The GNSS 118 may be implemented according to any global navigation satellite system, including a GPS, GLONASS, and/or Galileo based receiver and/or other device capable of determining absolute and/or relative position of the mobile platform 110 (e.g., or an element of the mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the survey system 100. In some embodiments, the GNSS 118 may include an altimeter, for example, or may be used to provide an absolute altitude.

The communications module 120 may be implemented as any wired and/or wireless communications module configured to transmit and receive analog and/or digital signals between elements of the survey system 100. For example, the communications module 120 may be configured to receive flight control signals and/or data from the base station 130 and provide them to the controller 112 and/or propulsion system 124. In other embodiments, the communications module 120 may be configured to receive images and/or other sensor information (e.g., visible spectrum and/or infrared still images or video images) from the sensor payload 140 and relay the sensor data to the controller 112 and/or base station 130. In some embodiments, the communications module 120 may be configured to support spread spectrum transmissions, for example, and/or multiple simultaneous communications channels between elements of the survey system 100. Wireless communication links may include one or more analog and/or digital radio communication links, such as WiFi and others, as described herein, and may be direct communication links established between elements of the survey system 100, for example, or may be relayed through one or more wireless relay stations configured to receive and retransmit wireless communications. Communication links established by the communication module 120 may be configured to transmit data between elements of the survey system 100 substantially continuously throughout operation of the survey system 100, where such data includes various types of sensor data, control parameters, and/or other data.

The gimbal system 122 may be implemented as an actuated gimbal mount, for example, that may be controlled by the controller 112 to stabilize the sensor payload 140 relative to a target or to aim the sensor payload 140 or components coupled thereto according to a desired direction and/or relative orientation or position. As such, the gimbal system 122 may be configured to provide a relative orientation of the sensor payload 140 (e.g., relative to an orientation of the mobile platform 110) to the controller 112 and/or communications module 120 (e.g., gimbal system 122 may include its own orientation sensor 114). In other embodiments, the gimbal system 122 may be implemented as a gravity driven mount (e.g., non-actuated). In various embodiments, the gimbal system 122 may be configured to provide power, support wired communications, and/or otherwise facilitate operation of articulated the sensor/sensor payload 140. In further embodiments, the gimbal system 122 may be configured to couple to a laser pointer, range finder, and/or other device, for example, to support, stabilize, power, and/or aim multiple devices (e.g., the sensor payload 140 and one or more other devices) substantially simultaneously.

In some embodiments, the gimbal system 122 may be adapted to rotate the sensor payload 140±90 degrees, or up to 360 degrees, in a vertical plane relative to an orientation and/or position of the mobile platform 110. In further embodiments, the gimbal system 122 may rotate the sensor payload 140 to be parallel to a longitudinal axis or a lateral axis of the mobile platform 110 as the mobile platform 110 yaws, which may provide 360 degree ranging and/or imaging in a horizontal plane relative to mobile platform 110. In various embodiments, controller 112 may be configured to monitor an orientation of gimbal system 122 and/or sensor payload 140 relative to mobile platform 110, for example, or an absolute or relative orientation of an element of sensor payload 140. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to the mobile platform 110 and/or to steer the mobile platform 110. In some embodiments, the propulsion system 124 may include multiple propellers (e.g., a tri, quad, hex, oct, or other type "copter") that can be controlled (e.g., by the controller 112) to provide lift and motion for the mobile platform 110 and to provide an orientation for mobile platform 110. In other embodiments, the propulsion system 124 may be configured primarily to provide thrust while other structures of the mobile platform 110 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of the mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the survey system 100 (e.g., controller 112) to provide operational control of the mobile platform 110 and/or the survey system 100.

In some embodiments, other modules 126 may include one or more actuated and/or articulated devices (e.g., light emitting devices (e.g., light emitting diodes), multi-spectrum active illuminators, visible and/or IR cameras, radars, sonars, and/or other actuated devices) coupled to the mobile platform 110, where each actuated device includes one or more actuators adapted to adjust an orientation of the device, relative to the mobile platform 110, in response to one or more control signals (e.g., provided by the controller 112). In particular, other modules 126 may include a stereo vision system configured to provide image data that may be used to calculate or estimate a position of the mobile platform 110, for example, or to calculate or estimate a relative position of a navigational hazard in proximity to the mobile platform 110. In various embodiments, the controller 112 may be configured to use such proximity and/or position information to help safely pilot the mobile platform 110 and/or monitor communication link quality, as described herein.

The user interface 132 of the base station 130 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 132 may be adapted to provide user input (e.g., as a type of signal and/or sensor information transmitted by the communications module 134 of the base station 130) to other devices of the survey system 100, such as the controller 112. The user interface 132 may also be implemented with one or more logic devices (e.g., similar to the controller 112) that may be adapted to store and/or execute instructions, such as software instructions, implementing any of the various processes and/or methods described herein. For example, the user interface 132 may be adapted to form communication links and transmit and/or receive communications (e.g., infrared images and/or other sensor signals, control signals, sensor information, user input, and/or other information), for example, or to perform various other processes and/or methods described herein.

In one embodiment, the user interface 132 may be adapted to display a time series of various sensor information and/or other parameters as part of or overlaid on a graph or map, which may be referenced to a position and/or orientation of the mobile platform 110 and/or other elements of the survey system 100. For example, the user interface 132 may be adapted to display a time series of positions, headings, and/or orientations of the mobile platform 110 and/or other elements of the survey system 100 overlaid on a geographical map, which may include one or more graphs indicating a corresponding time series of actuator control signals, sensor information, and/or other sensor and/or control signals.

In some embodiments, the user interface 132 may be adapted to accept user input including a user-defined target heading, waypoint, route, and/or orientation for an element of the survey system 100, for example, and to generate control signals to cause the mobile platform 110 to move according to the target heading, route, and/or orientation, or to aim the sensor payload 140 accordingly. In other embodiments, the user interface 132 may be adapted to accept user input modifying a control loop parameter of the controller 112, for example. In further embodiments, the user interface 132 may be adapted to accept user input including a user-defined target attitude, orientation, and/or position for an actuated or articulated device (e.g., the sensor payload 140) associated with the mobile platform 110, for example, and to generate control signals for adjusting an orientation and/or position of the actuated device according to the target altitude, orientation, and/or position. Such control signals may be transmitted to the controller 112 (e.g., using the communications modules 134 and 120), which may then control the mobile platform 110 accordingly.

The communications module 134 may be implemented as any wired and/or wireless communications module configured to transmit and receive analog and/or digital signals between elements of the survey system 100. For example, the communications module 134 may be configured to transmit flight control signals from the user interface 132 to communications module 120 or 144. In other embodiments, the communications module 134 may be configured to receive sensor data (e.g., visible spectrum and/or infrared still images or video images, or other sensor data) from the sensor payload 140. In some embodiments, the communications module 134 may be configured to support spread spectrum transmissions, for example, and/or multiple simultaneous communications channels between elements of the survey system 100. In various embodiments, the communications module 134 may be configured to monitor the status of a communication link established between the base station 130, sensor payload 140, and/or mobile platform 110 (e.g., including packet loss of transmitted and received data between elements of the survey system 100, such as with digital communication links), as described herein. Such status information may be provided to the user interface 132, for example, or transmitted to other elements of the survey system 100 for monitoring, storage, or further processing.

Other modules 136 of the base station 130 may include other and/or additional sensors, actuators, communications modules/nodes, and/or user interface devices used to provide additional environmental information associated with the base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the survey system 100 (e.g., controller 112) to provide operational control of the mobile platform 110 and/or survey system 100 or to process sensor data to compensate for environmental conditions, such as an water content in the atmosphere approximately at the same altitude and/or within the same area as the mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 132).

In embodiments where the imaging system/sensor payload 140 is implemented as an imaging device, the imaging system/sensor payload 140 may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 142 may include one or more logic devices (e.g., similar to the controller 112) that can be configured to process imagery captured by detector elements of the imaging module 142 before providing the imagery to memory 146 or the communications module 144. More generally, the imaging module 142 may be configured to perform any of the operations or methods described herein, at least in part, or in combination with the controller 112 and/or user interface 132.

In some embodiments, the sensor payload 140 may be implemented with a second or additional imaging modules similar to the imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communications module 144 of the sensor payload 140 may be implemented as any wired and/or wireless communications module configured to transmit and receive analog and/or digital signals between elements of the survey system 100. For example, the communications module 144 may be configured to transmit infrared images from the imaging module 142 to communications module 120 or 134. As another example, the communications module 144 may be configured to transmit measurement ranges to the communications module 120 or 134. In other embodiments, the communications module 144 may be configured to receive control signals (e.g., control signals directing capture, focus, selective filtering, and/or other operation of sensor payload 140) from the controller 112 and/or user interface 132. In some embodiments, communications module 144 may be configured to support spread spectrum transmissions, for example, and/or multiple simultaneous communications channels between elements of the survey system 100. In various embodiments, the communications module 144 may be configured to monitor and communicate the status of an orientation of the sensor payload 140 as described herein. Such status information may be provided or transmitted to other elements of the survey system 100 for monitoring, storage, or further processing.

The memory 146 may be implemented as one or more machine readable mediums and/or logic devices configured to store software instructions, sensor signals, control signals, operational parameters, calibration parameters, infrared images, and/or other data facilitating operation of the survey system 100, for example, and provide it to various elements of the survey system 100. The memory 146 may also be implemented, at least in part, as removable memory, such as a secure digital memory card for example including an interface for such memory.

An orientation sensor 148 of the sensor payload 140 may be implemented similar to the orientation sensor 114 or gyroscope/accelerometer 116, and/or any other device capable of measuring an orientation of the sensor payload 140, the imaging module 142, and/or other elements of the sensor payload 140 (e.g., magnitude and direction of roll, pitch, and/or yaw, relative to one or more reference orientations such as gravity, Magnetic North, and/or an orientation of the mobile platform 110) and providing such measurements as sensor signals that may be communicated to various devices of the survey system 100. A gyroscope/accelerometer (e.g., angular motion sensor) 150 of the sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 140 and/or various elements of the sensor payload 140 and providing such measurements as sensor signals that may be communicated to various devices of the survey system 100.

Other modules 152 of the sensor payload 140 may include other and/or additional sensors, actuators, communications modules/nodes, cooled or uncooled optical filters, and/or user interface devices used to provide additional environmental information associated with the sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 142 or other devices of the survey system 100 (e.g., controller 112) to provide operational control of the mobile platform 110 and/or survey system 100 or to process imagery to compensate for environmental conditions.

In general, each of the elements of the survey system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the survey system 100. In addition, one or more non-transitory mediums may be provided for storing machine readable instructions for loading into and execution by any logic device implemented with one or more of the devices of the survey system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the survey system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of the survey system 100 may include one or more modules supporting wired, wireless, and/or a combination of wired and wireless communication techniques. In some embodiments, various elements or portions of elements of the survey system 100 may be integrated with each other, for example, or may be integrated onto a single printed circuit board (PCB) to reduce system complexity, manufacturing costs, power requirements, coordinate frame errors, and/or timing errors between the various sensor measurements. Each element of the survey system 100 may include one or more batteries, capacitors, or other electrical power storage devices, for example, and may include one or more solar cell modules or other electrical power generating devices. In some embodiments, one or more of the devices may be powered by a power source for the mobile platform 110, using one or more power leads. Such power leads may also be used to support one or more communication techniques between elements of the survey system 100.

In one or more embodiments, the survey system 100 may include an optional launch and recovery box (LRB) 160 (e.g., also referred to as a launch and recovery device or launch and recovery system). In some aspects, the LRB 160 may be designed for unmanned aerial system (UAS) operation. The LRB 160 may include one or more imaging devices 162 (e.g., upwards looking cameras). In some cases, multiple/redundant imaging devices may be used to ensure proper vision even when one or more imaging devices are partially or fully obscured. The LRB 160 may generally have more power available (e.g., electrical power, computing power) than the mobile platform 110. With this additional power, the LRB 160 may be more amenable to and may be utilized to perform computationally intensive (e.g., CPU intensive) vision calculations that provide guidance to facilitate landing of the mobile platform 110 and/or other vehicle. In this regard, the LRB 160 may include one or more processors 164 for performing such computations.

In some aspects, the LRB 160 may be used to deploy/launch and recover a UAV (e.g., the mobile platform 110 in FIG. 1). As an example, the LRB 160 may initially stow a UAV. For an application/mission, the LRB 160 may open and the UAV may launch/fly from the LRB 160 to perform functionality associated with the application/mission (e.g., patrolling an area, taking images from one or more designated locations, and/or deliver payload to one or more designated locations). The UAV may then return to the LRB 160 and land on a landing platform provided by the LRB 160. In some cases, the UAV may be disposed on the landing platform (e.g., provided on a surface within a housing of the LRB 160) before deployment and may return to the landing platform. The LRB 160 may be static or moving. As one example of a movable LRB, the LRB 160 may itself be movable (e.g., having wheels, legs, propellers, and/or other movement mechanisms). As another example of a movable LRB, the LRB 160 may itself be stationary and disposed on a movable vehicle (e.g., a car). In some cases, a movable vehicle may have multiple LRBs disposed thereon (e.g., for facilitating applications/missions involving fleets of UAVs). Each LRB may provide an area on which a UAV can land.

To facilitate landing of the UAV on the landing platform provided by the LRB 160, the imaging device(s) 162 of the LRB 160 may dynamically (e.g., using artificial intelligence) detect and classify an object as the UAV. Once an object is detected and classified as the UAV, the UAV may be permitted to land on the landing platform of the LRB 160. The LRB 160 may initiate a communications link 166 to communicate with the UAV (e.g., the mobile platform 110 in FIG. 1). The communications link 166 may provide a link for communicating via tether communications (e.g., the communications link 166 is a tether), wireless communications, flash-coded lighting, and/or other wired and/or wireless communications mechanisms. As an example, the communications link 166 may include a tether that is connected to the UAV and rolls out with the UAV as the UAV flies from the LRB 160. Via the communications link 166, the LRB 160 may provide the UAV with a correct UAV orientation as the UAV descends toward the LRB 160 for facilitating landing of the UAV. The UAV may orient itself based on such orientation data and descend toward the landing platform with itself oriented according to the orientation data. In some cases, providing of such UAV orientation data may ensure the UAV is landing in a manner to permit charging, stowage of a payload, and minimal footprint.

Utilization of the LRB 160 may be associated with a latency factor (e.g., from the communications link 166) relative to when the UAV itself determines the correct orientation and/or performs other processing, but may allow for keeping/offloading weight, power usage, and/or computational processing off of the UAV. As an example, the LRB 160 may be more amenable to handling weight associated with having multiple redundant cameras, which may be used to ensure proper vision even when a camera is partially or fully obscured. The LRB 160 may be used alternatively from or together with fiducial markers to facilitate landing of UAVs. As an example of the LRB 160 used together with a fiducial marker, the landing platform of the LRB 160 may have a fiducial marker(s) disposed thereon that, together with communications (e.g., of orientation data) from the LRB 160 via the communications link 166, facilitates landing by the UAVs.

Figure 2:
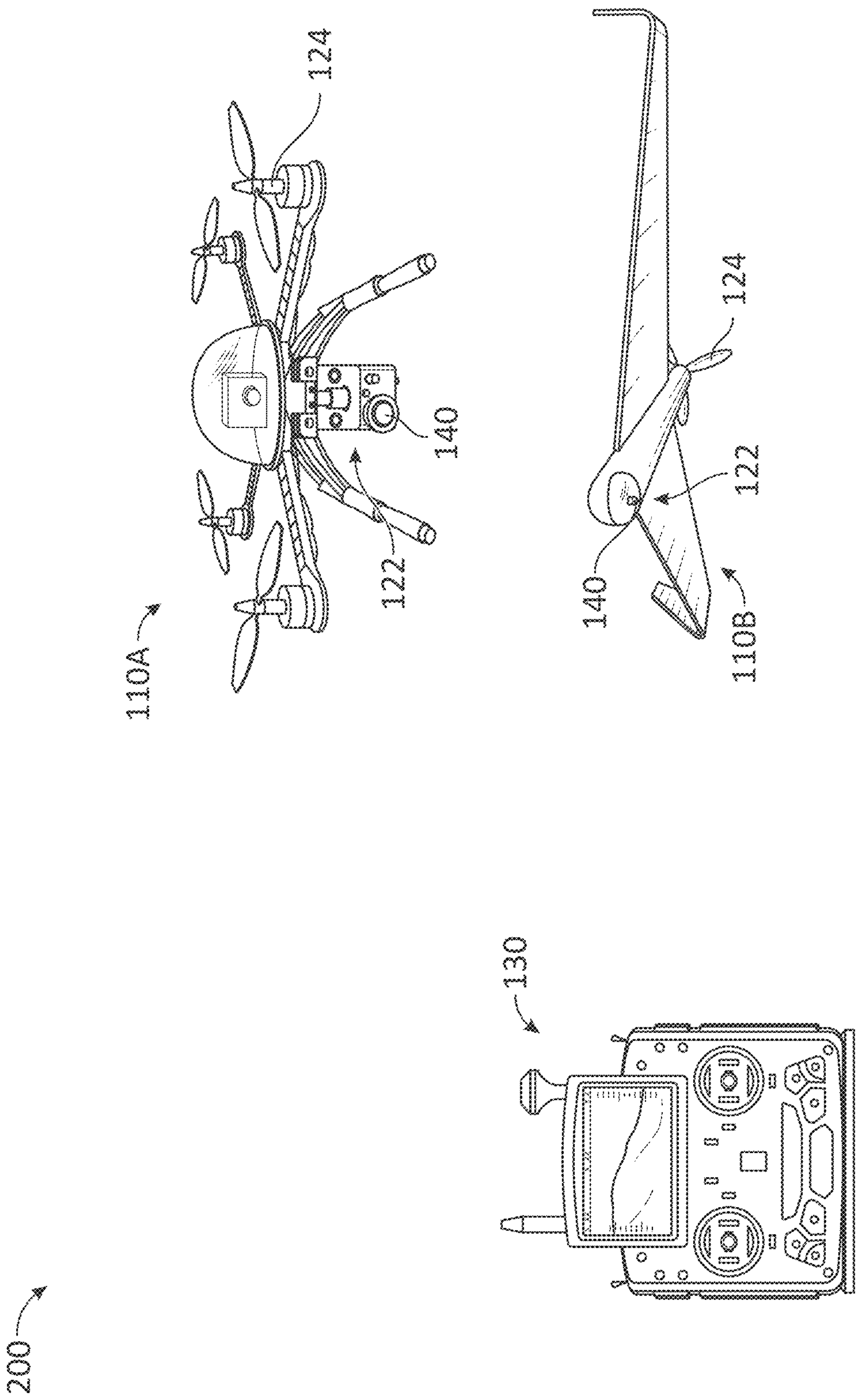
FIG. 2 illustrates a diagram of a survey system in accordance with one or more embodiments of the present disclosure.

FIG. 2 illustrates a diagram of a survey system 200 including mobile platforms 110A and 110B, each with sensor payloads 140 and associated gimbal systems 122 in accordance with one or more embodiments of the present disclosure. In the embodiment shown in FIG. 2, the survey system 200 includes a base station 130, mobile platform 110A with articulated imaging system/sensor payload 140 and gimbal system 122, and mobile platform 110B with articulated imaging system/sensor payload 140 and gimbal system 122, where the base station 130 may be configured to control motion, position, and/or orientation of the mobile platform 110A, mobile platform 110B, and/or sensor payloads 140. More generally, the survey system 200 may include any number of the mobile platforms 110, 110A, and/or 110B.

In one or more embodiments, systems and methods are provided to facilitate tracking of one or more fiducial markers by a UAV. In some aspects, such tracking may be performed even when the markers are partially obscured to a field of view(s) of a UAV's camera(s). Such occlusion may be due to objects in the environment (e.g., tree branches) and/or parts of the UAV itself (e.g., UAV's payload, UAV's landing gear/legs, etc.). In some cases, one or more fiducial markers may be provided (e.g., printed, disposed) on a landing platform/mat on which a UAV is to land. In this regard, detection of the fiducial marker(s) by the UAV may be performed to facilitate landing of the UAV. Fiducial marks include contour features. In general, fiducial markers may have a square shape with a black background and white contours inside, which may encode marker identification information. Non-limiting examples of fiducial markers may include ARToolKit markers, ARTag markers, AprilTag markers, and ArUco markers.

Fiducial marker detection capability may be based on limits to a maximum possible detection distance for fiducial markers as a function of, for example, marker size, marker complexity, and camera effective resolution; limits to a maximum viewing angle for markers (e.g., keystone effects when viewing a square marker from too tangential of an angle); and/or occlusion of the markers, such as by visible obstructions attached to a camera body (e.g., UAV legs) and/or shadows cast across the markers by surrounding obstacles and light sources. In general, a larger and less complex (e.g., less detailed) fiducial marker can be detected from farther away than a smaller and more complex fiducial marker. A fiducial marker may be designed with sufficient detail to reduce or avoid false positive detections (e.g., triggered by a camera view of a surrounding scenery).

In some aspects, as provided above, to facilitate landing (e.g., autonomous landing) by a UAV, the UAV may scan/detect for fiducial markers. To perform such a landing using a fiducial marker, the UAV may detect the marker and determine a location of the marker in a field of view of the UAV (e.g., a field of view(s) of one or more of the UAV's cameras). As an example, for a given fiducial marker, the UAV may detect for the four edges of the marker and then decode black and white pixels to determine an identity (ID) of the marker. The UAV generally has knowledge of markers to be interacted with (e.g., detected) by the UAV. By identifying the marker, the UAV may use prior marker dimension information associated with the identified marker to determine the location of the marker in a camera coordinate plane associated with the UAV. If the marker is stationary (e.g., the landing platform on which the marker is placed is stationary), the UAV may be able to use a GPS and/or other onboard sensor(s) to land on the marker. In some cases, such as when the GPS or other sensor signal exhibits drifting and/or is not precise enough to allow the UAV to land on the marker (e.g., the marker may be small, such as 1 meter by 1 meter), the UAV may need to track the marker continuously. If the marker is not stationary, such as a marker installed on a moving platform, the UAV may track the marker continuously to be able to precisely land on the platform.

Figure 3:
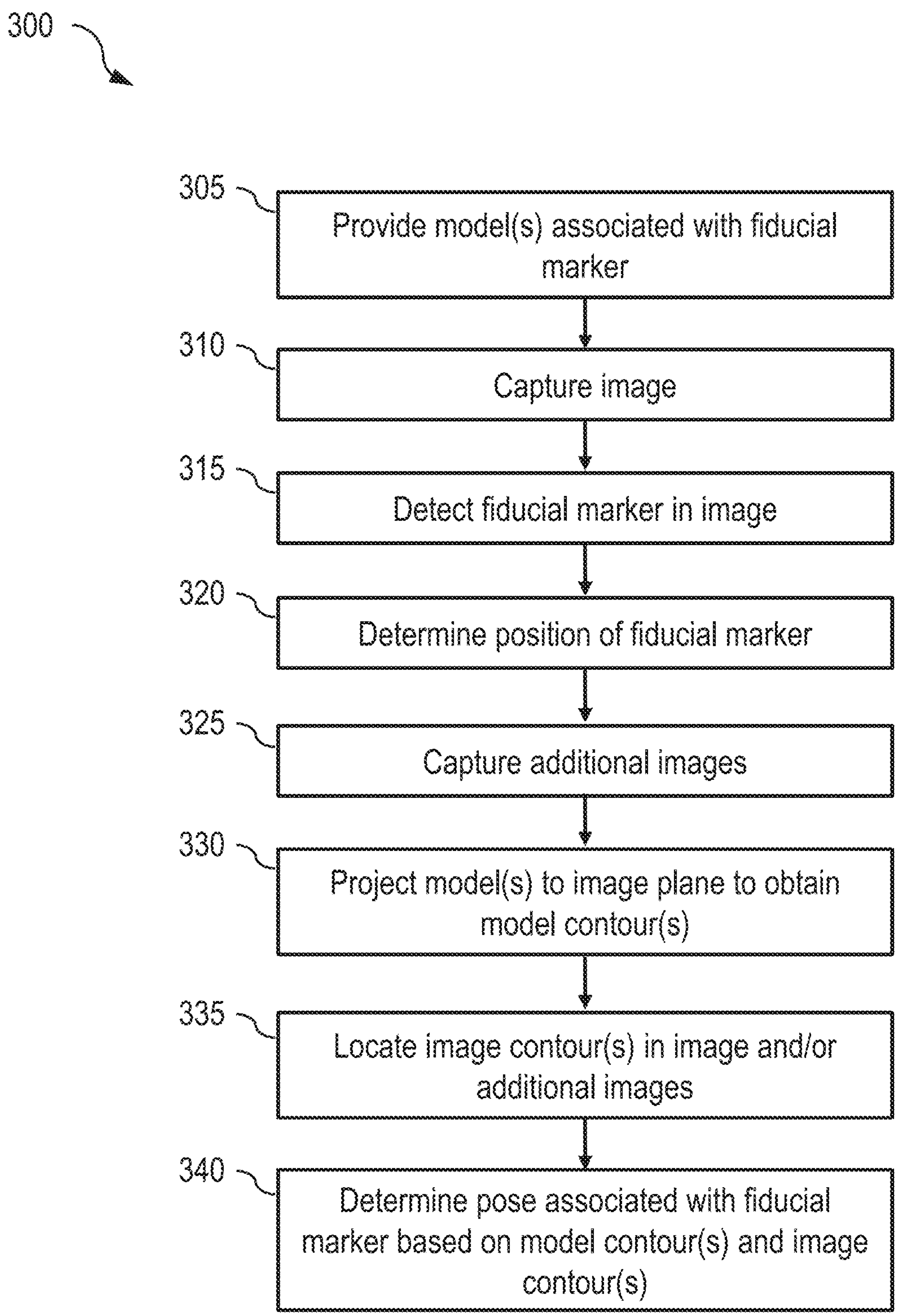
FIG. 3 illustrates a flow diagram of an example process for facilitating fiducial marker tracking in accordance with one or more embodiments of the present disclosure.
Figure 4:
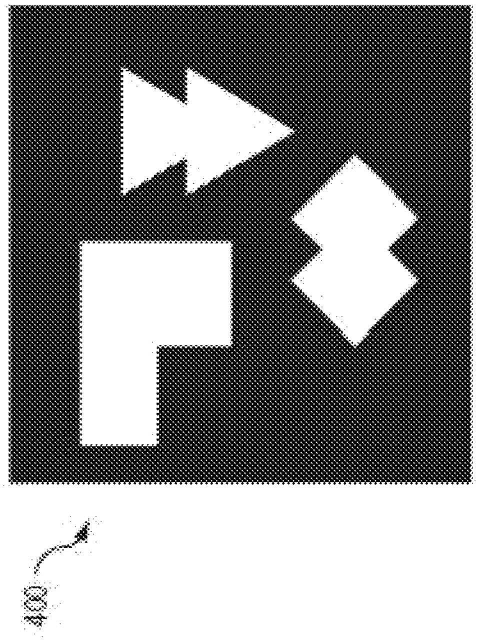
FIG. 4 illustrates an example fiducial marker.

FIG. 3 illustrates a flow diagram of an example process 300 for facilitating fiducial marker tracking in accordance with one or more embodiments of the present disclosure. For explanatory purposes, the process 300 is described with reference to FIG. 4, which illustrates an example fiducial marker 400 with three contours (e.g., forming three white contour shapes) in accordance with one or more embodiments of the present disclosure. However, although the process 300 is primarily described herein with reference to the fiducial marker 400 of FIG. 4 for explanatory purposes, the process 400 can be performed in relation to other fiducial markers. Note that one or more operations in FIG. 3 may be combined, omitted, and/or performed in a different order as desired.

At block 305, models associated with the fiducial marker 400 are provided to a UAV (e.g., the mobile platform 110A). Each model may be a model of a contour of the fiducial marker 400. Each model may be a three-dimensional model. A center of the fiducial marker 400 may be set as an origin of an XYZ coordinate system and XYZ coordinates of corners of the contours may be used for the models. A model for a contour i is $\{P_{ij}\}$, where i is an index of the contour and j is an index of the model points. In one case, these models may be generated by the UAV and stored onboard the UAV. Alternatively or in addition, these models may be generated outside the UAV (e.g., by a mission management system) and provided to the UAV for storage. For example, the UAV may store (and in some cases generate) models associated with all fiducial markers to be interacted with (e.g., for targeted landing and/or other purposes) by the UAV (e.g., for an application/mission). In some cases, a model(s) for a given fiducial marker may be stored in a database.

Figure 5C:
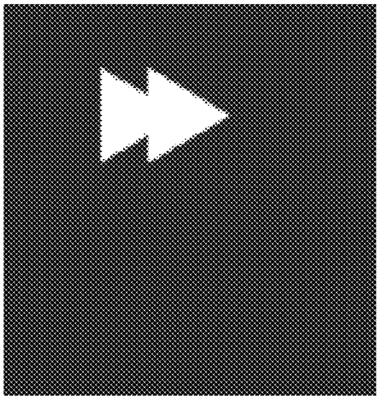
FIGS. 5A, 5B, and 5C each illustrate one of the contours of the fiducial marker of FIG. 4.
Figure 5B:
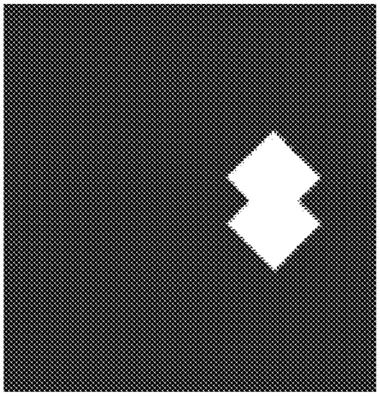
Figure 5A:
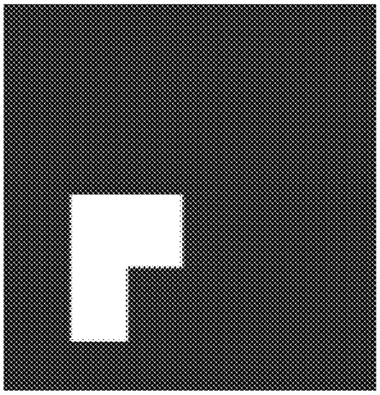

In an aspect, a contour may refer to an interface/edge between the black background of a fiducial marker and/or a shape by such interfaces/edges. A contour may also be referred to as a contour shape or an inner contour, since the contour is inside the black background of the fiducial marker 400. As examples, FIGS. 5A, 5B, and 5C each illustrate one of the three contours of the fiducial marker 400 of FIG. 4. The contour of FIG. 5A has an L shape, the contour of FIG. 5B has a shape of two overlapping diamonds, and the contour of FIG. 5C has a shape of two overlapping triangles. In some cases, the model(s) may be based on the fiducial marker 400, a landing mat on which the fiducial marker 400 is provided (e.g., positioned, printed, placed), a location of the fiducial marker 400 on the landing mat, and/or generally any information that relates to the fiducial marker 400 and/or the landing mat.

At block 310, the UAV captures an image using a camera (e.g., one of the components of the sensor payload 140). The camera may be a navigation camera of the UAV. At block 315, the UAV detects (at least) the fiducial marker 400 in the captured image. Such a detection of the fiducial marker 400 may be referred to as an initial detection of the fiducial marker 400. At block 320, the UAV determines a position of the fiducial marker 400 (e.g., based on the image and a camera image plane). The position may be stored by the UAV. This position may be referred to as an initial position of the fiducial marker 400. At block 325, the UAV captures images after the detection (e.g., initial detection) at block 315.

At block 330, the UAV projects the models (e.g., 3D models) of the inner contours to the camera image plane (e.g., 2D camera image plane). In an aspect, these projected contours may be referred to as model contours. The projection may be based on a last known position of the fiducial marker 400 (e.g., a position of the fiducial marker 400 in each of the images captured at block 325). The projection may also be based on known camera parameters (e.g., known camera intrinsic parameters). In some cases, such camera parameters may be stored by the UAV (e.g., in a configuration file) and loaded during each boot up. In an aspect, the camera parameters may be obtained from an offline calibration process (e.g., of the focal lens and/or other components of the camera). For example, the parameters may provide information to dewarp a fish eye distortion of a lens of the UAV camera to real coordinates. In one non-limiting example, the camera parameters may be represented in a 3×3 matrix denoted as K and the marker position may be represented by a 3×3 rotation matrix (represented by R) and a 3×1 translation vector (represented by T). With the matrices K and R and the vector T, the contour $\{P_{ij}\}$ may be projected into the UAV's camera plane.

At block 335, the UAV locates contours (e.g., using find contour processes) of the images captured at block 310 and 325. In an aspect, these contours may be referred to as image contours. Locating the contours may include edge detection. At block 340, the UAV determines poses associated with the fiducial marker 400 based on the model contours and the image contours. In an aspect, the image contours and model contours may be matched (e.g., using contour matching processes). With the matched image contours and model contours, the poses may be determined based on (e.g., using) iterative closest point processes. In some cases, the matching may be based on Hu moments. By performing the process 300, the fiducial marker 400 may be detected and its position tracked even in cases when the fiducial marker 400 is partially occluded. Blocks 305, 310, 315, 320, 325, 330, 335, and 340 may be implemented by one or more processing circuits. The processing circuit(s) may be part of the controller 112 and/or the imaging module 142.

Figure 6:
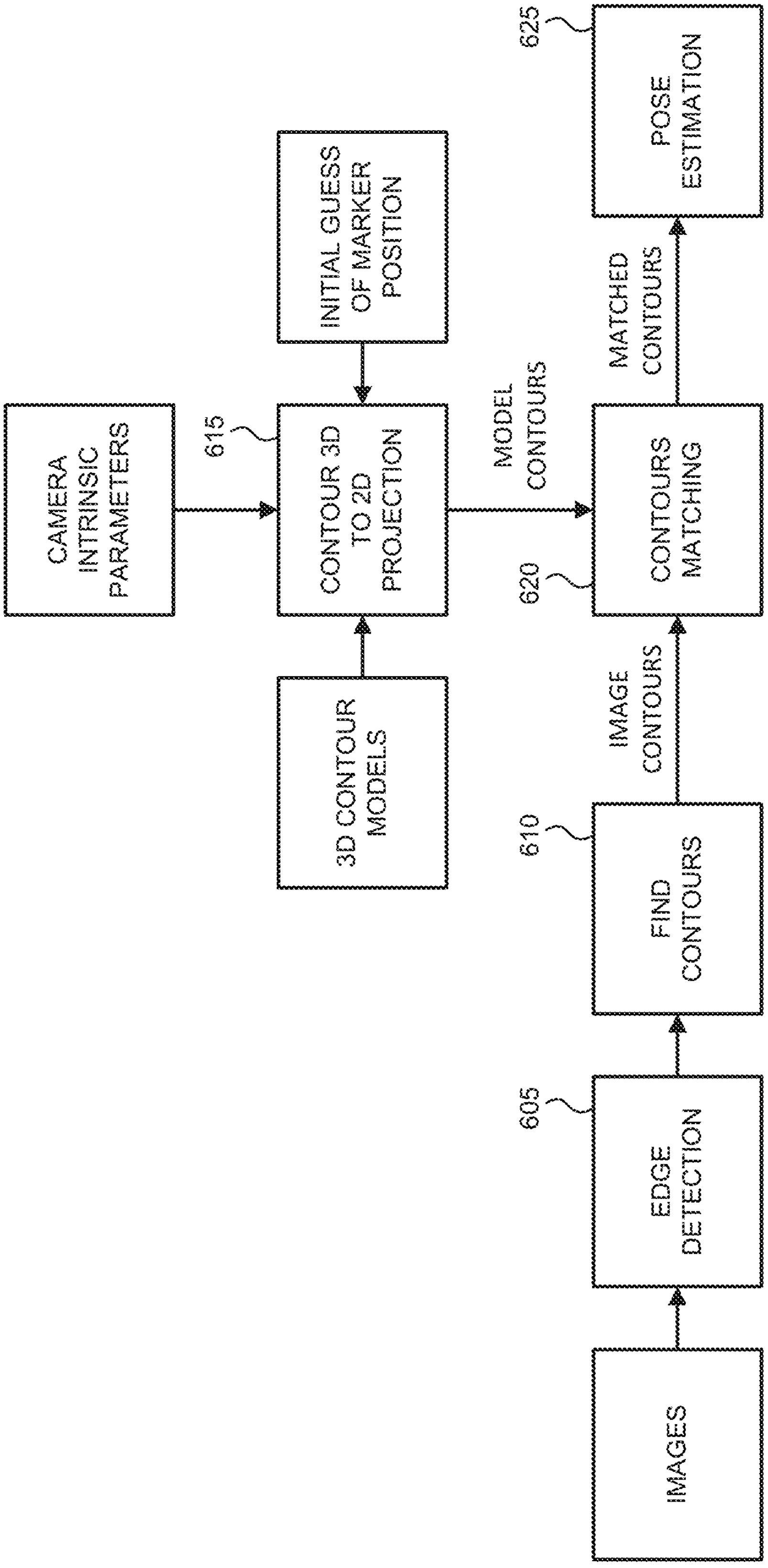
FIG. 6 illustrates an example process and information flow that may be associated with the process of FIG. 3 in accordance with one or more embodiments of the present disclosure.

FIG. 6 illustrates an example process and information flow that may be associated with the process 300 of FIG. 3 in accordance with one or more embodiments of the present disclosure. At block 605, the UAV performs an edge detection 605 on images captured by the UAV (e.g., at blocks 310 and 325). At block 610, the UAV finds contours in the images to obtain image contours. In an aspect, blocks 605 and 610 may collectively implement block 335. At block 615, the UAV performs contour 3D to 2D projection to obtain model contours. The projection may be based on camera intrinsic parameters, 3D contour models, and an initial estimated position of the fiducial marker 400. At block 620, the UAV performs contour matching to obtain matched contours. At block 625, the UAV performs pose estimation based on the matched contours.

In one or more embodiments, multiple/redundant fiducial markers may be used to facilitate fiducial marker detection and related applications (e.g., landing a UAV). In some aspects, these markers may be arranged to allow: at least one fiducial marker among the multiple/redundant fiducial markers to be fully visible to at least one of the cameras (e.g., a first camera) of the UAV and detectable from a maximum desired distance (e.g., height and position offset); at least one fiducial marker among the multiple/redundant fiducial markers to be fully visible to at least one of the cameras (e.g., a second camera) of the UAV and detectable from the closest possible viewing distance (e.g., usually a desired landing position of the UAV); and at least one marker to be fully visible to at least one of the cameras (e.g., a third camera) of the UAV and detectable for positions between the maximum desired detection distance and the closest possible viewing distance. It is noted that the first camera, the second camera, and the third camera may be the same camera or different cameras (e.g., two or three different cameras). The camera(s) may be a navigation camera(a) of the UAV. In one example, the UAV may have four downward facing navigation cameras. An angle to view/detect a fiducial marker may depend on a wind, an orientation of the UAV (e.g., whether the UAV is tilted), a location of the UAV relative to a landing mat, and so forth. The maximum desired distance (e.g., also referred to as a target distance) may be determined by an accuracy of other position measurements, such as those from a GPS and/or SONAR/LIDAR. In some embodiments, a multiple/redundant fiducial marker layout may be used in conjunction with tracking the fiducial marker(s) described above at least with respect to FIG. 3.

In some aspects, the multiple/redundant fiducial markers may include two or more differently sized fiducial markers (e.g., on a landing mat). Larger fiducial markers may allow for a higher maximum desired detection distance, but may take up more of a UAV camera's field of view as the UAV/camera gets closer to the markers (e.g., resulting in likely occlusion and/or keystone/skewing effects and worsened detection). Smaller fiducial markers may allow for detection at proximity to the markers, but have a lower maximum desired detection distance. Thus, to satisfy maximum/minimum viewing distance objectives, leveraging two or more differently sized fiducial markers may allow the UAV to detect at least one marker during a transition/descent between the maximum desired detection distance and the closest possible viewing distance.

In designing a multiple/redundant fiducial marker layout, a size and/or a number of fiducial markers to include in the layout may involve inspecting (e.g., a camera feed) to identify known/fixed occlusions. Such a design may optimize selection and placement of redundant markers such that the markers are wholly visible/detectable at a given height and are likely to be visible when another redundant marker is not visible, and vice versa. In this regard, fiducial markers of similar sizes may be placed such that at least one of the markers is likely to be un-occluded regardless of an orientation or a position of the camera/UAV. For other occlusions (e.g., unknown/dynamic occlusions such as a shadow from the UAV or a nearby obstacle), the layout may include a sufficient number of fiducial markers of the same or similar size placed far enough apart to reduce a likelihood that multiple fiducial markers are occluded (e.g., concurrently occluded) by obstacles/shadows.

Figure 7:
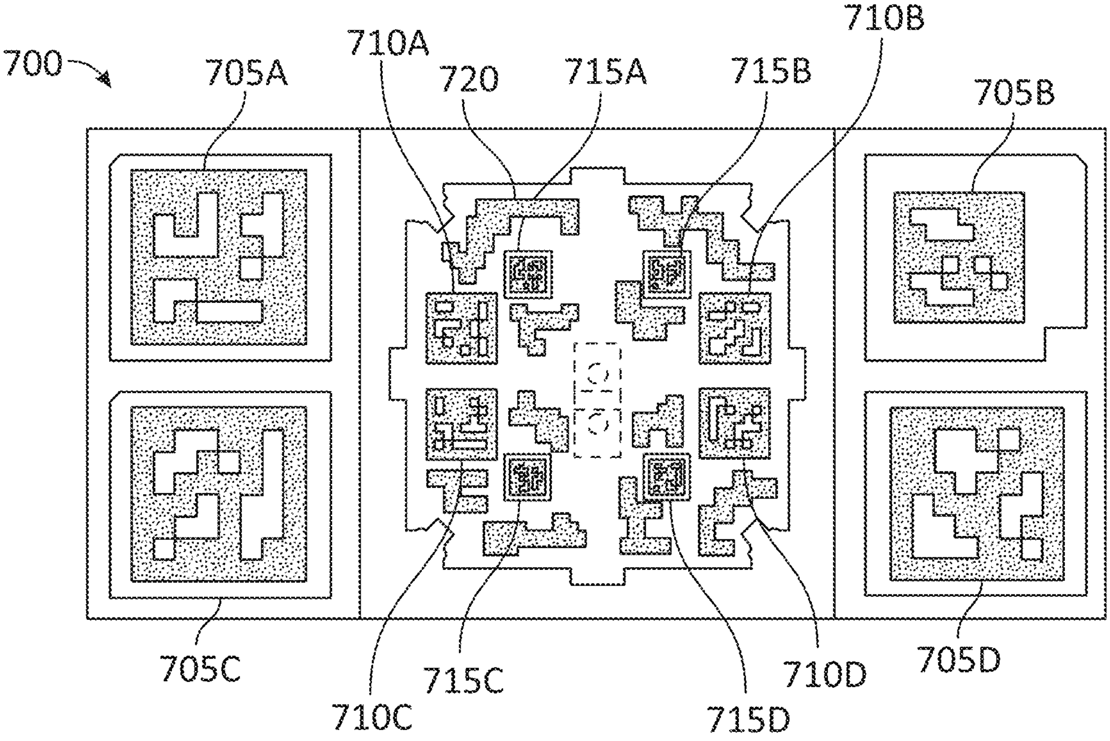
FIG. 7 illustrates an example fiducial marker structure in accordance with one or more embodiments of the present disclosure.

FIG. 7 illustrates an example fiducial marker structure 700 (e.g., also referred to as a fiducial marker layout) in accordance with one or more embodiments of the present disclosure. In an embodiment, the fiducial marker structure 700 may be on a landing mat. The fiducial marker structure 700 includes fiducial markers 705A-D, 710A-D, and 715A-D. Remaining features of the fiducial marker structure 700, such as a feature 720, may be used as a feature (e.g., a known shape) to be tracked according to one or more embodiments (e.g., FIG. 3). It is noted that such tracking features are optional in multiple/redundant fiducial marker layouts. The fiducial markers 705A-D may be of the same or similar sizes, the fiducial markers 710A-D may be of the same or similar sizes, and the fiducial markers 715A-D may be of the same or similar sizes. By way of non-limiting examples, two fiducial markers may be considered to be of similar sizes when a difference in area of the fiducial markers are less than 1%, less than 2%, less than 5%, or less than 10%. Similarly sized markers may facilitate having at least one of these markers being wholly visible through any gaps in a camera view. Various similar or same sized markers being on either side of the fiducial marker structure 700 (e.g., the fiducial markers 705A and 705C are on opposite sides from the fiducial markers 705B and 705D, the fiducial markers 710A and 710C are on opposite sides from the fiducial markers 710B and 710D) may provide redundancy for dynamic condition. The smaller markers (e.g., the fiducial markers 710A-D relative to the fiducial markers 705A-D and the fiducial markers 715A-D relative to the fiducial markers 705A-D and 710A-D) placed near the center of the fiducial marker structure 700 may reduce an impact of a minimum viewing distance and keystone/skewing effects. In various aspects, the UAV knows a layout of the fiducial marker structure and/or the landing mat. Once the UAV detects one of the fiducial markers and determines its ID, a position of the remaining fiducial markers may be determined based on the position and ID of the detected fiducial marker.

Figure 8:
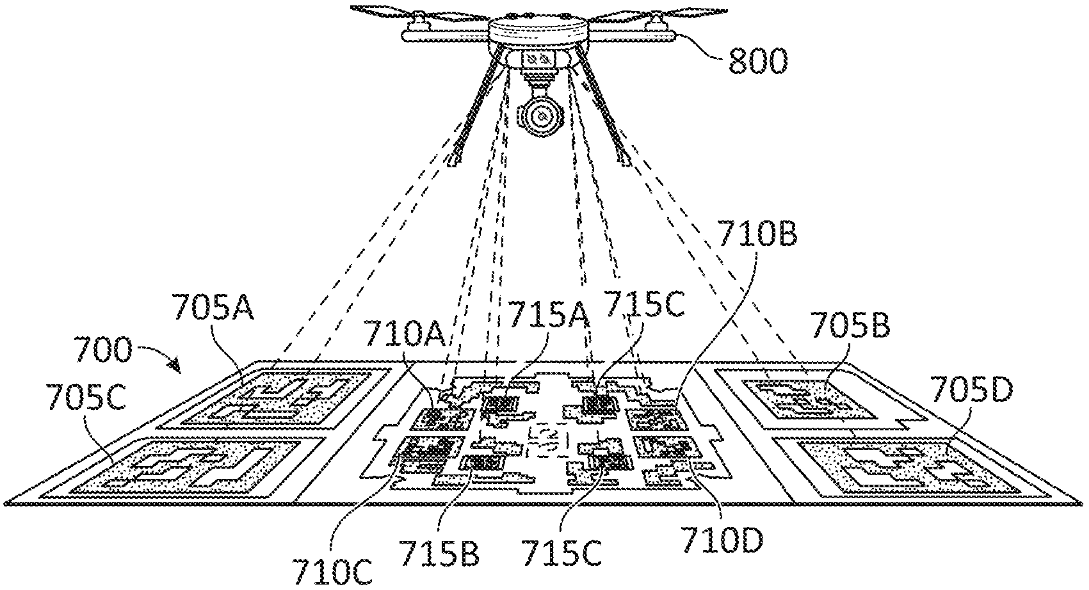
FIG. 8 illustrates viewing/detection of a fiducial marker structure by an unmanned aerial vehicle in accordance with one or more embodiments of the present disclosure.

FIG. 8 illustrates viewing/detection of the fiducial marker structure 700 by a UAV 800 in accordance with one or more embodiments of the present disclosure. As an example, a usable distance (e.g., a range from a minimum detection distance to a maximum detection distance) of the fiducial markers 705A-D may be around 2 meters to around 12 meters, a usable distance of the fiducial markers 710A-D may be around 0.5 meters to around 4 meters, and/or a usable distance of the fiducial markers 715A-D may be around 0 meters to around 1 meters.

In various aspects, a number of markers that can be included in a fiducial marker structure (e.g., a landing mat or other object on which the fiducial marker structure is placed, printed, or otherwise visually provided/positioned on) may be constrained (e.g., generally due to size constraints). In some cases, a fiducial marker structure may be included on a surface of an LRB. A UAV trajectory may be modified to facilitate use of a fiducial marker structure (e.g., for targeted landing). To facilitate use of the fiducial marker structure, the fiducial marker structure may be designed such that, during an approach to the fiducial marker structure (e.g., the landing mat onto which the fiducial marker structure is provided), the UAV can determine which of the fiducial markers of the fiducial marker structure are consistently (e.g., most consistently) detected and, based on such determinations, rotate the UAV (e.g., rotate the UAV camera(s) and/or the yaw of the UAV) to facilitate targeting/detecting of these consistently detected fiducial markers with the UAV's camera(s). Such rotation of the UAV may help ensure that the selected marker(s) stay detected until the UAV approaches and other marker(s) can then be detected consistently. Alternatively or in addition to rotating the UAV, the fiducial marker structure and/or the UAV trajectory may be adjusted such that certain of the fiducial markers of the fiducial marker structure is not actively observed by the UAV (e.g., during descent and landing). For example, if one or more of the fiducial markers of the fiducial marker structure are consistently or dynamically occluded (e.g., by debris and/or shadows), the UAV may position itself and/or arrange itself (e.g., through rotation of the UAV and/or its camera(s)) to view the remaining marker(s).

Figure 9:
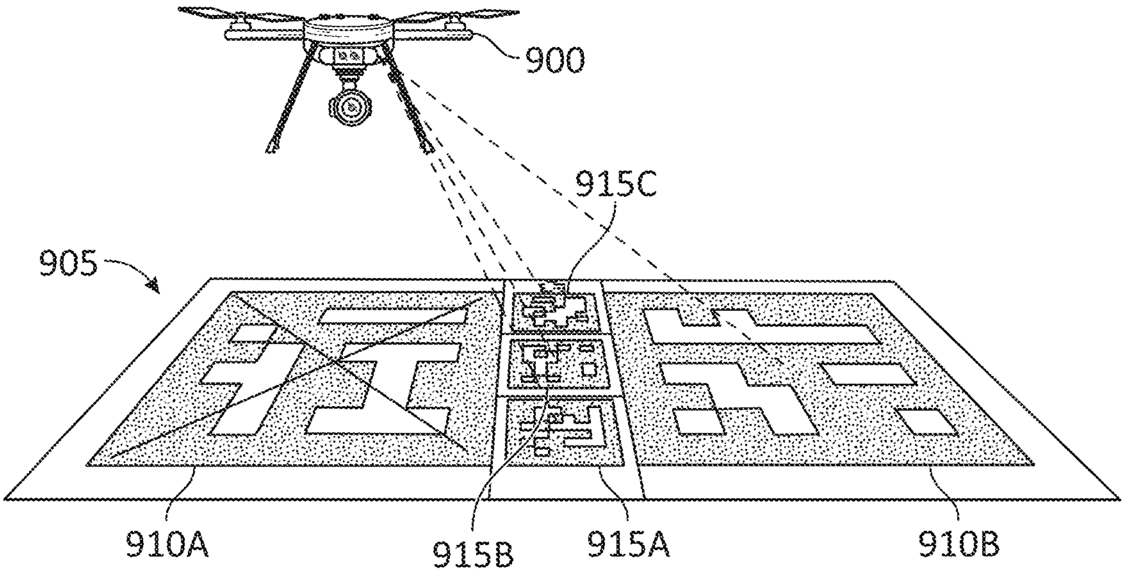
FIG. 9 illustrates viewing/detection of a subset of fiducial markers of a fiducial marker structure by an unmanned aerial vehicle in accordance with one or more embodiments of the present disclosure.

FIG. 9 illustrates viewing/detection of a subset of fiducial markers of a fiducial marker structure 905 by a UAV 900 in accordance with one or more embodiments of the present disclosure. The fiducial marker structure 905 includes fiducial markers 910A-B and 915A-C. In FIG. 9, the UAV 900 may determine that the fiducial markers 910B and 915A-C are consistently detected whereas the fiducial marker 910A is not consistently detected. For example, the UAV 900 may determine the fiducial marker 910A to have bad lighting and/or to be occluded by an object (e.g., a tree or tree branch). In some cases, the UAV 900 may position itself and/or arrange itself (e.g., through rotation of the UAV 900 and/or its camera(s)) to observe the remaining fiducial markers 910B and 915A-C (e.g., during descent). In some cases, a location of the fiducial marker 910A may be used as a landing location of the UAV 900. In this regard, in some cases, the UAV 900 may dynamically determine such an offset landing location (e.g., the location of the fiducial marker 910A) based on detecting the fiducial markers 910B and 915A-C.

In one or more embodiments, camera (e.g., UAV camera) exposure and gain control may be performed to facilitate fiducial marker detection. A relationship between a camera's exposure and gain and an intensity setting for fiducial marker detection is generally non-linear. In various embodiments, an architecture with an intensity controller and a fiducial marker searching device may set a camera's exposure and gain to facilitate fiducial marker detection. In some cases, such facilitated fiducial marker detection may in turn facilitate applications that utilize fiducial marker detection, such as landing a UAV on a target (e.g., a landing mat onto which a fiducial marker(s) is provided, such as a landing mat of/on an LRB in some cases) using a fiducial marker(s) to localize the target. In some cases, fiducial markers may be made up of colors and/or shades to provide contrast points for fiducial marker detection processes. In this regard, various fiducial marker detectors may look for (e.g., may be sensitive to) edges between light/dark shades, corners, and/or other contrast-based features. In some cases, the exposure of the camera is selected/fixed first before determining the gain of the camera.

Imaging devices (e.g., cameras) are limited to a certain dynamic range. For a given exposure and gain setting of an imaging device, a certain intensity band of light may be observed by the imaging device. A dark feature or a light feature in a resulting image may be referred to as washed out when an intensity of the feature is not captured within a dynamic range of the imaging device. For example, if the exposure setting is too large (e.g., slower shutter speed), bright image features may become washed out. In some cases, two features having different shades may both appear as completely white to the imaging device. In this regard, the imaging device is not sensitive to any contrast between these two features, resulting in a loss of detection for that contrast point (e.g., which does not appear to the imaging device as a contrast point). Using various embodiments, exposure and/or gain control of an imaging device may be performed to set the exposure and/or gain to facilitate detection by maintaining contrasts of features and not washing out features (e.g., such as features having different shades).

Figure 10:
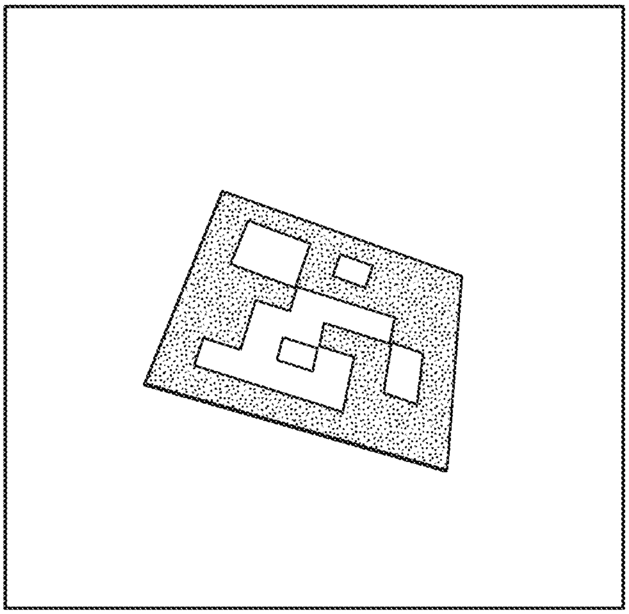
FIG. 10 illustrates an image of an example fiducial marker isolated from any scene image data captured by an imaging device in accordance with one or more embodiments.
Figure 11:
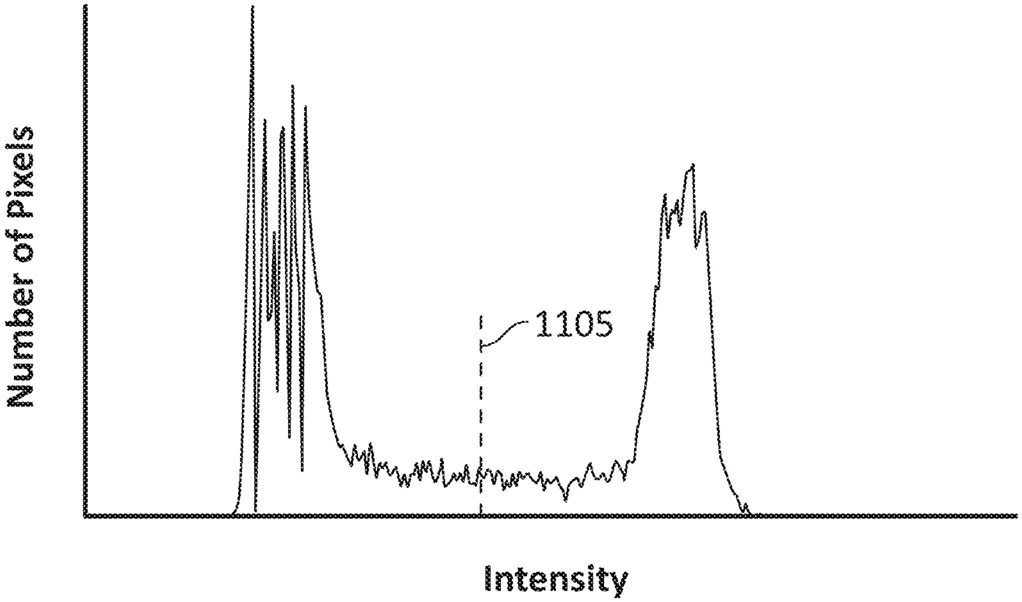
FIG. 11 illustrates an intensity histogram associated with the isolated fiducial marker of FIG. 10.

In some embodiments, fiducial markers have some black features and some white features. The fiducial markers may be printed on a material with a non-zero reflectivity (e.g., since a non-reflective material may cause black features to appear to have zero intensity). FIG. 10 illustrates an image of an example fiducial marker isolated from any scene image data captured by an imaging device in accordance with one or more embodiments. FIG. 11 illustrates an intensity histogram associated with the isolated fiducial marker of FIG. 10. In this regard, the intensity histogram considers only image pixels that make up the fiducial marker and ignores image pixels that do not make up the fiducial marker. The intensity history provides an intensity value along the horizontal axis and a number of pixels that exhibit each intensity value along the vertical axis. The intensity histogram has a centroid 1105 (e.g., also referred to as an intensity centroid). As an example, the horizontal axis may provide a dynamic range with a current exposure and gain setting. For an 8 bit example, the intensity value may span from 0 to 255 in which lower values are black features and higher values are white features). As shown in FIG. 11, the isolated fiducial marker has a bi-modal intensity histogram with a high number of pixels (e.g., peaks) at lower intensity values and high intensity values and a lower number of pixels in between these peaks.

Figure 12A:
FIGS. 12A, 12B, and 12C illustrate example histograms for a full camera scene with exposure/gain set too high, too low, and optimally, respectively.
Figure 12B:
Figure 12C:
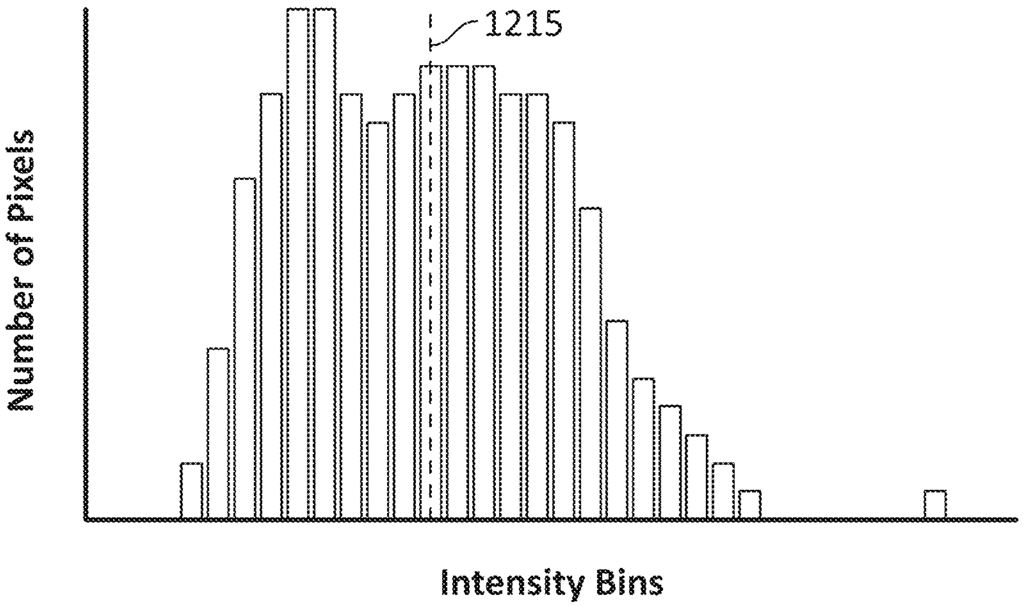

Isolation of a fiducial marker from a rest of a camera image may be performed after detection of the fiducial marker. FIGS. 12A, 12B, and 12C illustrate example histograms for a full camera scene with exposure and/or gain set too high, too low, and optimally, respectively. The histogram of FIG. 12A shows most pixels concentrated in a few high intensity bins. The histogram of FIG. 12B shows most pixels concentrated in a few low histogram intensity bins. As shown by FIG. 12C relative to FIGS. 12A and 12B, the histogram of FIG. 12C has few pixels in the highest and lowest intensity bins. In this regard, the histogram of FIG. 12C shows pixels with values distributed across an entire dynamic range of a scene with no pixels washed out (e.g., flattened at an end of a histogram and interpreted as completely black or completely white). As shown by FIGS. 11 and 12C, bi-modal histogram pixels associated with the fiducial marker forms part of (e.g., is hiding) within the total scene histogram of FIG. 12C. In some cases, further tuning of the histogram of FIG. 12C from exposure and/or gain settings may be performed to obtain sufficient marker contrast. The histograms of FIGS. 12A, 12B, and 12C have centroids 1205, 1210, and 1215, respectively.

Figure 13:
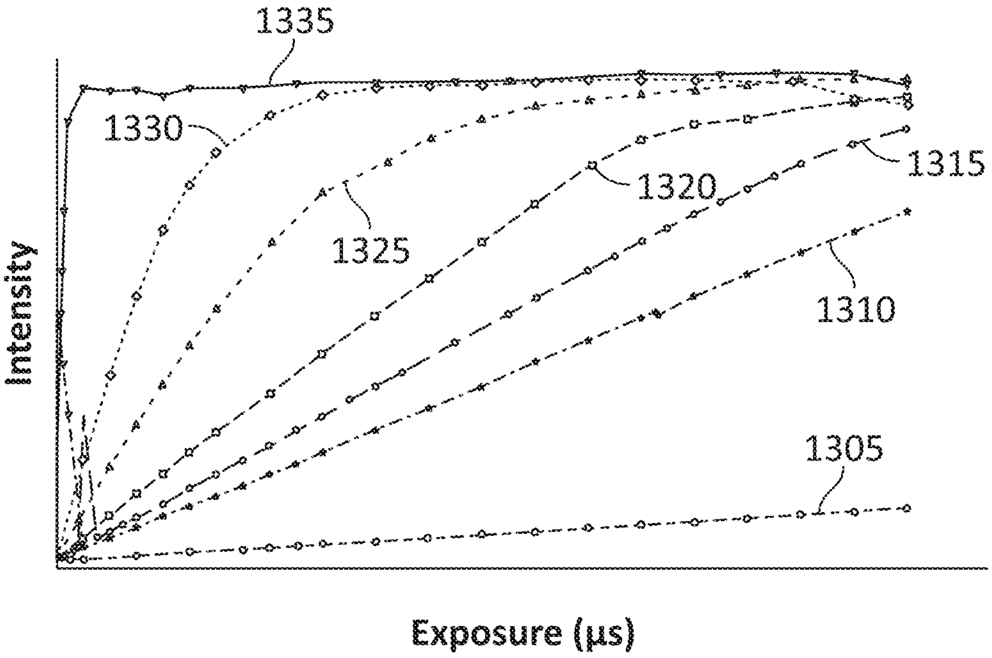
FIG. 13 illustrates a graph with a relationship between exposure and intensity for seven scenes of different brightness.

A relationship between a camera's exposure and gain and an intensity setting for fiducial marker detection is generally non-linear. FIG. 13 illustrates a graph with a relationship between exposure (along the horizontal axis) and intensity (along the vertical axis) for seven scenes of different brightness. The graph shows curves 1305, 1310, 1315, 1320, 1325, 1330, and 1335. In general, the curves 1305, 1310, 1315, 1320, 1325, 1330, and 1335 are listed in order of general scene brightness from a darkest scene associated with the curve 1305 to a brightest scene associated with the curve 1335. For example, the curves 1305, 1310, 1315, and 1335 may be associated with a scene captured at twilight, dusk, daytime, and daytime snow scene or bright sunny day, respectively. As shown, for example, by the curve 1335, a relationship between the exposure setting and the resulting intensity is very non-linear, with a small change to the exposure for a very bright scene creating a very large or a very small change to the resulting intensity. For a darker scene (e.g., dusk or nighttime), such as the curves 1305 and 1310, a relationship between the exposure and intensity is more linear. However, the relationship may still be considered/classified as non-linear (e.g., no linear mapping available) since a slope of the linear relationships associated with darker scenes changes with a darkness of the scenes. It is noted that relationship to intensity for changes to a camera's gain setting is similar to the relationship to intensity for changes to a camera's exposure setting provided above.

In various embodiments, a linear controller may be used to control an intensity of a scene in a timely and accurate manner. A basic form of this controller is that a change in exposure and/or gain relates directly to a gain, a target intensity, and a measured intensity. Since such a controller utilizes a linear relationship between an output and an error, the non-linear relationship between gain and intensity and exposure and intensity may be linearized to implement the controller. An example implementation to perform such a linearization is described in Annex A, which is incorporated herein by reference in its entirety.

With a linearized controller (e.g., an exposure/gain-based centroid controller), a centroid target may be implemented in a timely manner (e.g., pending system delay, deadbands for exposure and gain settings) through use of appropriate camera settings. To facilitate detection of fiducial markers, an appropriate centroid is to be targeted. With reference back to FIG. 13, for a landing mat having a non-zero reflectivity, the fiducial markers may appear washed out compared to an intensity of surrounding features. As one example, for a bright summer day with a grass backdrop, the landing mat may reflect much more light than the surroundings and thus need a comparatively lower centroid target. As another example, for a cloudy winter day with a snowy backdrop, the landing mat may reflect much less light than the surroundings and thus need a comparatively higher centroid target.

To facilitate detection of fiducial markers, a sweep/search of a centroid target may be performed. In some aspects, such sweeping processes may be used to determine an appropriate target centroid to accommodate a general case in which the cameras do not determine which kind of scene a UAV is in (e.g., the cameras do not have available information to make sure a determination). Such a sweep may provide an appropriate camera exposure and/or gain to maintain feature contrasts in an image and avoid washing out features (e.g., such as features having different shades).

The centroid target may be swept up and down (e.g., between a minimum centroid value and a maximum centroid value or between a 0 to 1 for a normalized centroid). To select an appropriate centroid target for detection of the fiducial markers, a closed-loop signal from a fiducial marker detector may be used. Such a detector may alert a user when a marker is detected at a current exposure and gain setting and resulting measured centroid. As an example, the centroid target may be determined to be 0.94 in a very bright scene (e.g., sunny grass scene).

To ensure time sensitive detection, the sweep for the target centroid may be performed at an appropriate speed while ensuring adequate detection and centroid time-alignment. In some cases, to make up for camera reporting delay, the target centroid may be backtracked after a detection is reported to account for the change in centroid during a delay period. In one aspect, for a UAV with multiple navigation cameras available, each camera may be appropriately viewing the same scene and can reduce a target centroid sweeping region for the other cameras once a detection is observed in a single camera. In some cases, once a portion of an image is determined to contain a fiducial marker, pixels associated with the fiducial marker(s) may be isolated from the rest of the image and a target centroid determined based on an isolated histogram for the fiducial marker. For example, the isolated histogram of FIG. 11 has the centroid 1105. Thus, once a fiducial marker is detected (e.g., as a result of sweeping a target centroid back and forth), camera settings may be further tuned to better continue detecting the fiducial maker and/or other fiducial markers. A sweeping range may be narrowed for the other cameras once the fiducial marker is detected. For example, if a camera detects a fiducial marker using a centroid of 30%, the other cameras may sweep around in a narrower range around the centroid of 30%, such as sweeping from 15% to 45% rather than sweeping from 0% to 100%). In some cases, in addition to performing a sweep of the centroid target, a sweep of a yaw and/or a position of a UAV may also be performed to facilitate detection of fiducial markers. The sweep of the yaw and/or the position of the UAV may allow the UAV to avoid bad lighting and/or occlusions on the fiducial markers while searching for the fiducial markers.

In some aspects, the centroid target may become deterministic (e.g., in which case the searching sweep is not just narrowed). As an example, for an isolated AprilTag fiducial marker, such as shown in FIG. 10, the centroid target may become deterministic. In this regard, the known distribution of the 'white' and 'black' squares in the isolated histogram (e.g., shown in FIG. 11) may be used to explicitly compute the centroid target. For example, for tag 386 for 36 h11, there are 46 'black' squares and 18 'white' squares. All squares are of the same size (disregarding keystoning effects). An expected normalized [0,1] centroid target may be computed (e.g., computed deterministically) as 18/46=0.39 (e.g., without performing a sweep/search of a centroid target). The computed centroid target may be used directly (e.g., to provide an appropriate camera exposure and/or gain) as long as the isolated AprilTag histogram associated with the tag 386 for 36 h11 continues to be used.

More generally, rather than fiducial markers formed of 'white' and 'black' squares, a fiducial marker may be characterized as having different portions (e.g., continuous portions/shapes) each being represented using a respective visual representation value (e.g., color value or grayscale value). As an example, with reference to FIG. 4, the fiducial marker 400 may be considered as having four portions. The portions may include the white L-shape, the white overlapping diamonds-shape, the white overlapping triangles-shape, and the remaining black background. As another example, with reference to FIG. 10, the fiducial marker may be considered as having five portions. The portions may include the two 'white' squares, the 'white' rectangle, the remaining 'white' shape, and the remaining 'black' background of the fiducial marker. It is noted that, in some cases, the portions for the fiducial markers of FIGS. 4 and 10 may be defined differently from those provided above by way of non-limiting examples (e.g., more or fewer than four portions for the fiducial marker 400 of FIG. 4, more or fewer than five portions for the fiducial marker of FIG. 10). In these examples, for a given fiducial marker, a centroid target may be computed based on the known distribution (e.g., percentage, proportion) of a respective amount of the fiducial marker associated with each visual representation value (e.g., amount of the fiducial marker that is 'white', 'black', or any other visual representation value in the fiducial marker).

Figure 14:
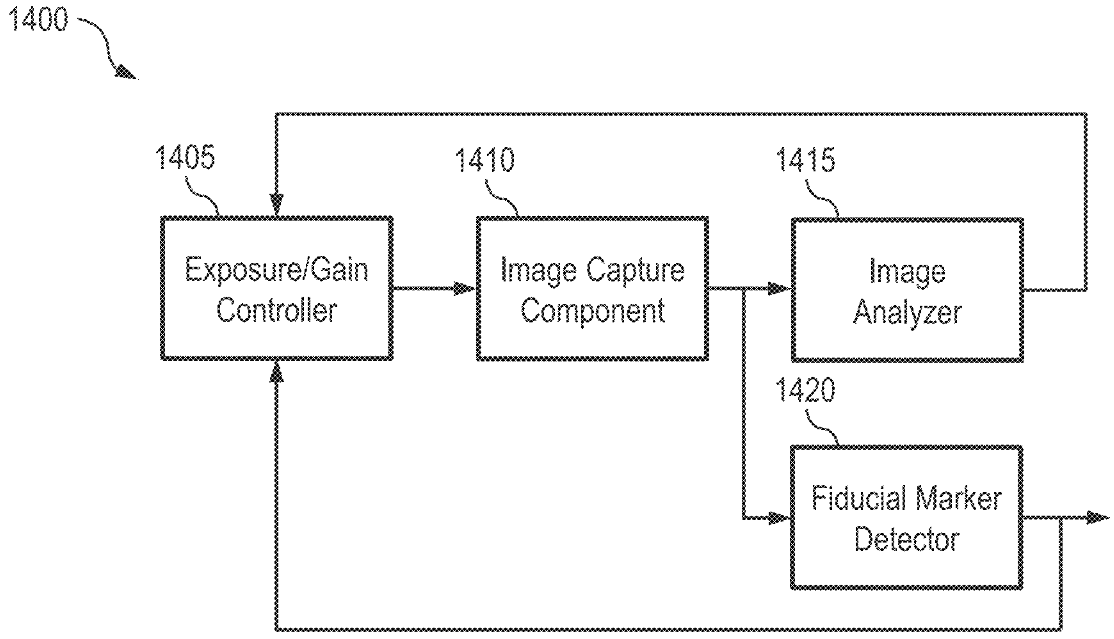
FIG. 14 illustrates an example system and associated flow for facilitating centroid sweeping and associated with fiducial marker detection in accordance with one or more embodiments of the present disclosure.

FIG. 14 illustrates an example system 1400 and associated flow for facilitating centroid sweeping and associated with fiducial marker detection in accordance with one or more embodiments of the present disclosure. In an embodiment, for explanatory purposes, the system 1400 may be implemented by each imaging device (e.g., camera) of a UAV. The system 1400 includes an exposure and gain controller 1405, an image capture component 1410 (e.g., an FPA), an image analyzer 1415, and a fiducial marker detector 1420. The exposure and gain controller 1405 sets exposure and gain settings of the image capture component 1410. The image capture component 1410 captures an image using the exposure and gain settings. In some cases, the image capture component 1410 may be a navigation camera of the UAV. The image analyzer 1415 receives an image from the image capture component 1410. The image analyzer 1415 may determine an intensity histogram (e.g., intensity values or bins on horizontal axis and number of pixels on vertical axis) from the image and/or an intensity centroid value associated with the histogram. The histogram and/or intensity centroid value is provided as feedback to the exposure and gain controller 1405. In an aspect, the intensity histogram (or centroid value) may be subtracted from a previous iteration's intensity histogram (or previous iteration's centroid value) and this difference provided to the exposure and gain controller 1405.

The fiducial marker detector 1420 receives the image from the image capture component 1410 and determines whether a fiducial marker is detected in the image. A feedback indicative of whether a fiducial marker is detected in the image is provided as an output (e.g., to components downstream of the system 1400) and as feedback to the exposure and gain controller 1405. For example, components downstream of the system 1400 may use the output of the fiducial marker detector 1420 to adjust operation of the UAV, such as redirecting the UAV, adjusting light emitting devices of the UAV, and/or others. In some cases, in addition to sweeping the exposure and/or gain, a yaw and/or a position of the UAV may be swept, such as to avoid bad lighting and/or other occlusions while searching for fiducial markers.

The exposure and gain controller 1405 may adjust the exposure and/or gain of the image capture component 1410 based on the feedback from the image analyzer 1415 and the fiducial marker detector 1420. If no fiducial marker is detected by the fiducial marker detector 1420, the exposure and gain controller 1405 may adjust the exposure and/or gain to effectuate sweeping of the intensity centroid. In some cases, if a fiducial marker is detected by the fiducial marker detector 1420, the exposure and gain controller 1405 may be able to narrow a range of intensity centroids over which to sweep for the image capture component 1410 and/or other image capture components of the UAV. In some cases, one imaging device of the UAV may provide data to facilitate fiducial marker detection by other imaging devices of the UAV. For example, if a fiducial marker is detected by a first camera of the UAV using a centroid of 30%, the other cameras may sweep around in a narrower range around the centroid of 30%, such as sweeping from 15% to 45% rather than sweeping from 0% to 100%). In some cases, such as when the detected fiducial marker has a known distribution of a respective amount of each visual representation value, the centroid target may be computed deterministically (e.g., without using a sweep).

In an embodiment, the exposure and gain controller 1405, image analyzer 1415, and fiducial marker detector 1420 may be implemented by one or more processing circuits. It is noted that, while the image analyzer 1415 and fiducial marker detector 1420 are depicted as separate components in FIG. 14, the image analyzer 1415 and fiducial marker detector 1420 may be implemented as a single component. The processing circuit(s) may be part of the controller 112 and/or the imaging module 142.

In some embodiments, a UAV may be equipped with navigation/indicator light emitting devices to allow a pilot to illuminate objects (e.g., nearby objects) and see the UAV's position in low illumination situations/environments such as nighttime. To facilitate night operations, such navigation/indicator light emitting devices may complement thermal IR cameras that may also be equipped on the UAV. In some cases, the cameras may have black and white channels (e.g., no color channels). By way of non-limiting examples, the navigation/indicator light emitting devices may include a green light (e.g., green light emitting diode), a red light, and a near infrared light.

In some cases, navigation/indicator light emitting devices on a UAV are used to illuminate a scene to facilitate detection of fiducial markers (e.g., for targeted landings), including in low illumination situations/environments such as nighttime. For example, the navigation/indicator light emitting devices may be brighter during a landing and/or other indicative event than a normal operation of the navigation/indicator light emitting devices. In some aspects, use of such light emitting devices on a UAV may allow targeted landing (e.g., at night) using visual fiducial marker detection without external lighting. By increasing the brightness of the navigation/indicator lights of the UAV for a short time (e.g., 1 minute, 2 minutes, 5 minutes), light cast onto a landing area may be sufficient to detect the fiducial markers and facilitate successful landing. In some cases, adjustment of the brightness of the navigation/indicator lights may be performed in conjunction with a sweep of a centroid to determine an appropriate exposure and/or gain setting for a UAV camera.

Figure 15A:
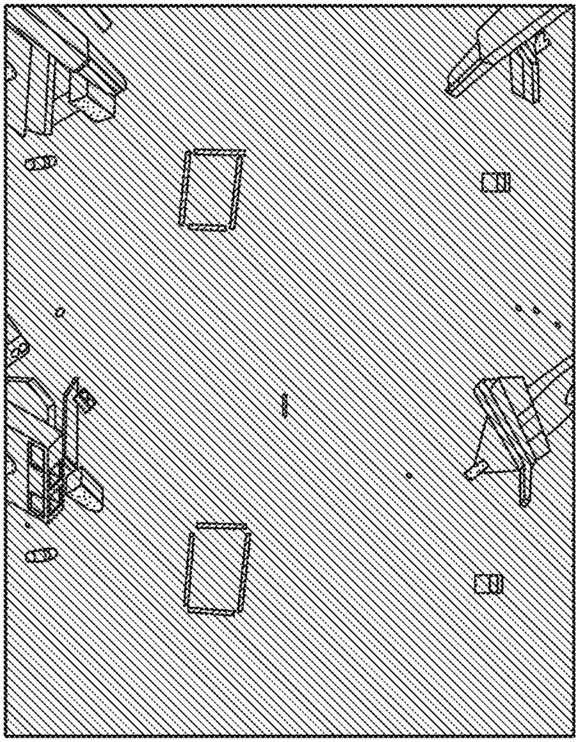
FIGS. 15A and 15B illustrate images containing a landing mat with illumination inactive and illumination active, respectively, in accordance with one or more embodiments of the present disclosure.
Figure 15B:
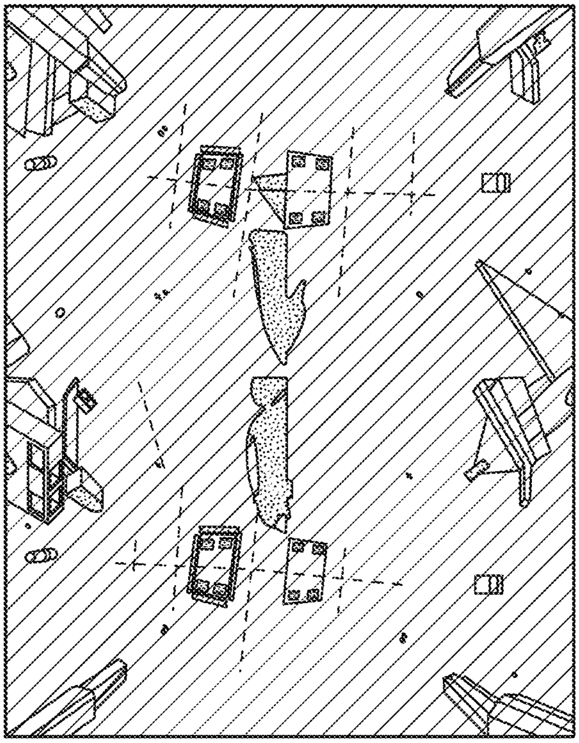

The light emitting devices may emit pulse-width-modulated (PWM) signals. A brightness level of such emitted signals may be adjusted by adjusting a duty cycle. Due to power and/or thermal constraints, the light emitting devices may operate using a PWM signal at a brightness level which does not damage the light emitting devices and/or other components (e.g., components close to the light emitting devices and/or having low thermal tolerance), such as due to excessive power draw and/or high temperatures, and is visible to the pilot while not being too bright as to cause eye damage to the pilot and/or others. The duty cycle (e.g., and thus resulting intensity) may be automatically modified to illuminate the ground and near-by objects. Such modification of the duty cycle may be performed in conjunction with a closed-loop exposure/gain sweeping process to detect fiducial markers on a landing mat. Through a combination of a long PWM duty-cycle on the navigation/indicator light emitting devices and an exposure/gain sweep, a UAV may detect fiducial markers. As one example, the UAV may detect the fiducial markers from up to a certain altitude (e.g., 5 meters, 8 meters, 10 meters) above the ground. The duty cycle and/or flashing behavior of the light emitting devices may be varied to retain a desired brightness on the landing mat during descent and/or notify the user that a target landing is in progress. As examples, FIGS. 15A and 15B illustrate images containing a landing mat with illumination inactive and illumination active, respectively. In FIG. 15B, the navigation/indicator light emitting devices are set to a higher PWM duty cycle. Other components of the UAV, such as those close to the light emitting devices, may be appropriately designed to tolerate heat associated with the PWM signals emitted by the light emitting devices. The light emitting devices and the components may be appropriate to allow emission of the light emitting devices of high PWM duty cycles (e.g., 80% or higher, 90% or higher, 100%) for a duration of time (e.g., one minute to five minutes). After this duration of time, the light emitting devices may overheat.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

Annex A

Annex A provides example linearization techniques for intensity versus exposure and gain control. By way of non-limiting example, the linearization techniques are described with respect to FIGS. 12A through 12C. In various embodiments, a linear controller may be used to control an intensity of a scene in a timely and accurate manner. A basic form of this controller is provided by:

Δ(exposure/gain)=gain*(target intensity−measured intensity)

To linearize the non-linear relationships between gain and intensity and exposure and intensity, a function may be established to describe the relationship between the intensity and the exposure and gain, depending on a current intensity, exposure, and gain operating point. An intensity of a scene may be quantified numerally from a histogram by determining a centroid value of the histogram. In an aspect, the centroid value may be a medoid-based shadow value (MSV) centroid value. The centroids 1205, 1210, and 1215 are shown in FIGS. 12A, 12B, and 12C, respectively. This may be provided by:

meas_*msv*_centroid=sum(*i*=0→histogram_length)[*i**histogram_value_at_*i*]/sum(*i*=0→histogram_length)[histogram_value_at_*i*]

The gain and exposure may be combined before linearization with a parameter exposure gain:

exposuregain=exposure*gain

Exposure changes may generally be used where possible to avoid generating gain noise in an image. After a maximum exposure is reached (e.g., defined arbitrarily to avoid blue in the image), the gain may be changed to further brighten the image. As shown in FIG. 13, darker scenes are associated with a linear-like relationship, where the exposure gain/centroid line passes through zero.

A first linearization term may be provided by exposuregain_factor_1=exposuregain/centroid for a given value of "exposuregain" and "centroid". This first linearization term may be associated with a static slope-based linearization.

A resulting controller error may then be provided by:

linear_controller_error_factor_1=(centroid target−centroid measured)*exposuregain_factor_1

Turning then to the brighter scenes in FIG. 13, the relationship is less linear than darker scenes. The exposuregain/centroid line does not travel straight from the current exposuregain and centroid operating point through [0,0].

To supplement and complete the linearization, a dynamic slope of the exposuregain versus centroid function may be estimated. The slope of the line may be dynamically calculated using the centroid and exposuregain from a previous timestep, defined as centroid[k−1] and exposuregain[k−1].

exposuregain_factor_2=(exposuregain[*k*]−exposuregain[*k*−1])/(centroid_measured[*k*]−centroid_measured[*k*−1])

The resulting controller error is then linear_controller_error_factor_2=(centroid target−centroid measured)*exposuregain_factor_2

The exposuregain_factor_2 relies on a changing exposuregain and/or centroid value for the slope to be computed. This linearization term may be associated with a dynamic slope-based linearization. The exposuregain factors may be combined together into a single linearization term depending on a dynamic state of the system. An example combination may be provided by:

exposuregain_factor_combined=(1.0−exposuregain_centroid_change_factor)*exposuregain_factor_1+(exposuregain_centroid_change_factor)*exposuregain_factor_2 where exposuregain_centroid_change_factor is a function of exposuregain or centroid change normalized to [0,1].

With this combination, if the exposuregain or centroid have a large enough non-zero velocity, the dynamic slope-based linearization of exposuregain_factor_2 dominates over the static slope-based linearization of exposuregain_factor_1. This combination provides a linearized exposure-gain-based centroid controller.

What is claimed is:

1. A method comprising:

capturing, by a camera of an unmanned aerial vehicle using a parameter setting, a first image;

identifying one or more first image contours in the first image;

determining a first position of a fiducial marker in the first image;

projecting, based at least on the first position, models associated with one or more contours of the fiducial marker into an image plane of the camera to obtain one or more first model contours;

determining a first pose associated with the fiducial marker based at least on the one or more first image contours and the one or more first model contours;

determining an intensity histogram based on pixels of the first image associated with the fiducial marker;

determining a centroid associated with the first image based on the intensity histogram; and adjusting the parameter setting based on the centroid.

2. The method of claim 1, further comprising:

capturing, by the camera, a second image to track the fiducial marker;

identifying one or more second image contours in the second image;

determining a second position of the fiducial marker in the second image;

projecting, based at least on the second position, the models into the image plane of the camera to obtain one or more second model contours; and determining a second pose associated with the fiducial marker based at least on the one or more second image contours and the one or more second model contours, wherein the fiducial marker is partially occluded in the first image and/or the second image.

3. The method of claim 1, wherein the fiducial marker is partially occluded in the first image, and wherein the fiducial marker is partially occluded by a portion of the unmanned aerial vehicle.

4. The method of claim 1, wherein the models comprise three-dimensional (3D) models and the image plane comprises a two-dimensional (2D) image plane of the camera.

5. The method of claim 1, further comprising performing contour matching on the one or more first image contours and the one or more first model contours, wherein the first pose is based on the contour matching, wherein the contour matching is based on Hu moments, and wherein the first pose is determined based on iterative closest point processes.

6. The method of claim 1, wherein the fiducial marker is disposed on a landing platform, wherein the fiducial marker is a first fiducial marker of a plurality of fiducial markers on the landing platform, the method further comprising:

descending the unmanned aerial vehicle toward the landing platform; and as the unmanned aerial vehicle descends, detecting at least one fiducial marker among a first subset of the plurality of fiducial markers when the unmanned aerial vehicle is within a first altitude range from the landing platform, wherein the first subset comprises the first fiducial marker and a second fiducial marker of the plurality of fiducial markers.

7. The method of claim 6, further comprising, as the unmanned aerial vehicle descends, detecting at least one fiducial marker among a second subset of the plurality of fiducial markers when the unmanned aerial vehicle is within a second altitude range from the landing platform, wherein the second subset comprises a third fiducial marker of the plurality of fiducial markers and a fourth fiducial marker of the plurality of fiducial markers, wherein the first and the second fiducial markers have the same or similar sizes, and wherein the third and the fourth fiducial markers have the same or similar sizes and are smaller than the first and the second fiducial markers.

8. The method of claim 6, further comprising:

landing the unmanned aerial vehicle; and detecting at least one fiducial marker among a second subset of the plurality of fiducial markers when the unmanned aerial vehicle is on the landing platform.

9. The method of claim 1, wherein the fiducial marker is disposed on a landing platform, wherein the fiducial marker is a first fiducial marker of a plurality of fiducial markers on the landing platform, the method further comprising adjusting a trajectory of the unmanned aerial vehicle and/or a landing position of the unmanned aerial vehicle based at least on detections of one or more of the plurality of fiducial markers as the unmanned aerial vehicle descends.

10. The method of claim 1, wherein the fiducial marker is disposed on a landing platform, wherein the landing platform comprises a launch and recovery box (LRB), the method further comprising:

receiving orientation data from the LRB;

orienting the unmanned aerial vehicle based on the orientation data; and descending the unmanned aerial vehicle toward the landing platform with the unmanned aerial vehicle oriented according to the orientation data.

11. The method of claim 1, further comprising:

capturing, by the camera using the adjusted parameter setting, a second image;

detecting the fiducial marker in the second image, wherein the fiducial marker is associated with a plurality of visual representation values, and wherein the centroid is determined based on a respective amount of the fiducial marker associated with each of the plurality of visual representation values;

setting a duty cycle for a light emitting device of the unmanned aerial vehicle; end emitting, by the light emitting device, a pulse-width-modulated signal according to the duty cycle.

12. A method comprising:

capturing, by a camera of an unmanned aerial vehicle, a first image;

identifying one or more first image contours in the first image;

determining a first position of a fiducial marker in the first image;

projecting, based at least on the first position, models associated with one or more contours of the fiducial marker into an image plane of the camera to obtain one or more first model contours;

determining a first pose associated with the fiducial marker based at least on the one or more first image contours and the one or more first model contours;

capturing, by the camera using a parameter setting, a second image;

determining a centroid associated with the second image;

determining whether the fiducial marker is in the second image; and adjusting, based at least on whether the fiducial marker is determined to be in the second image, the centroid by adjusting the parameter setting, wherein the parameter setting is an exposure setting or a gain setting.

13. The method of claim 12, further comprising:

setting a duty cycle for a light emitting device of the unmanned aerial vehicle based at least on the centroid; and emitting, by the light emitting device, a pulse-width-modulated signal according to the duty cycle.

14. An unmanned aerial vehicle comprising:

a camera configured to capture an image using a parameter setting, wherein the parameter setting is an exposure setting or a gain setting; and a processing circuit configured to:

descend the unmanned aerial vehicle toward a landing platform, wherein a plurality of fiducial markers are disposed on the landing platform;

detect, as the unmanned aerial vehicle descends, at least one fiducial marker among a first subset of the plurality of fiducial markers when the unmanned aerial vehicle is within a first altitude range from the landing platform;

detect, as the unmanned aerial vehicle descends, at least one fiducial marker among a second subset of the plurality of fiducial markers when the unmanned aerial vehicle is within a second altitude range from the landing platform;

determine a centroid associated with the image;

determine whether one of the plurality of fiducial markers is in the image; and adjust, based at least on whether one of the plurality of fiducial markers is determined to be in the image, the centroid by adjusting the parameter setting.

15. The unmanned aerial vehicle of claim 14, wherein the first subset comprises a first fiducial marker and a second fiducial marker having the same or similar sizes, and wherein the second subset comprises a third fiducial marker and a fourth fiducial marker having the same or similar sizes and are smaller than the first and the second fiducial markers, and wherein the processing circuit is further configured to:

land the unmanned aerial vehicle; and detect at least one fiducial marker among a third subset of the plurality of fiducial markers when the unmanned aerial vehicle is on the landing platform.

16. The unmanned aerial vehicle of claim 14, wherein the processing circuit is further configured to adjust a trajectory of the unmanned aerial vehicle and/or a landing position of the unmanned aerial vehicle based at least on detections of one or more of the plurality of fiducial markers as the unmanned aerial vehicle descends, and wherein the landing platform comprises a launch and recovery box (LRB), and wherein the processing circuit is further configured to:

receive orientation data from the LRB;

orient the unmanned aerial vehicle based on the orientation data; and descend the unmanned aerial vehicle toward the landing platform with the unmanned aerial vehicle oriented according to the orientation data.

17. The unmanned aerial vehicle of claim 14, wherein the processing circuit is further configured to:

identify one or more image contours in the image;

determine a position of a first fiducial marker of the plurality of fiducial markers in the image;

project, based at least on the position, models associated with one or more contours of the first fiducial marker into an image plane of the camera to obtain one or more model contours; and determine a pose associated with the first fiducial marker based at least on the one or more image contours and the one or more model contours, wherein the first fiducial marker is partially occluded in the image by a portion of the unmanned aerial vehicle.

18. The unmanned aerial vehicle of claim 17, wherein the models comprise three-dimensional (3D) models and the image plane comprises a two-dimensional (2D) image plane of the camera, wherein the processing circuit is further configured to perform contour matching on the one or more image contours and the one or more model contours, and wherein the pose is based on the contour matching.

19. The unmanned aerial vehicle of claim 14, further comprising a light emitting device configured to emit a pulse-width-modulated signal according to a duty cycle, wherein the processing circuit is further configured to set the duty cycle for the light emitting device based at least on the centroid.

20. The unmanned aerial vehicle of claim 14, wherein the processing circuit is further configured to:

detect the one of the plurality of fiducial markers in the image, wherein the one of the plurality of fiducial markers is associated with a plurality of visual representation values; and determine the centroid based on a respective amount of the one of the plurality of fiducial markers associated with each of the plurality of visual representation values.

* * * * *